(12) United States Patent
Green

(10) Patent No.: US 7,816,802 B2
(45) Date of Patent: Oct. 19, 2010

(54) ELECTRICITY GENERATING ASSEMBLY

(76) Inventor: William M Green, P.O. Box 278, Robersonville, NC (US) 27871

( * ) Notice: Subject to any disclaimer, the term of this patent is extended or adjusted under 35 U.S.C. 154(b) by 307 days.

(21) Appl. No.: 11/867,436

(22) Filed: Oct. 4, 2007

(65) Prior Publication Data

US 2008/0169652 A1     Jul. 17, 2008

Related U.S. Application Data

(60) Provisional application No. 60/849,842, filed on Oct. 6, 2006, provisional application No. 60/915,591, filed on May 2, 2007.

(51) Int. Cl.
*F03D 9/00* (2006.01)
*H02P 9/04* (2006.01)

(52) U.S. Cl. .............................. 290/55; 290/44; 415/4.2; 310/154.01

(58) Field of Classification Search ................. 290/44, 290/55; 415/4.2; 310/154.01
See application file for complete search history.

(56) References Cited

U.S. PATENT DOCUMENTS

| | | | | |
|---|---|---|---|---|
| 94,641 | A * | 9/1869 | Piher | 415/45 |
| 103,742 | A | 5/1870 | Heald | 415/33 |
| 169,051 | A | 10/1875 | Short | 415/4.2 |
| 177,597 | A | 5/1876 | Ward | 415/4.2 |
| 222,256 | A * | 12/1879 | Dewees | 415/155 |
| 232,558 | A * | 9/1880 | Smith | 415/4.2 |
| 250,806 | A | 12/1881 | Hamel | 415/4.2 |
| 273,642 | A * | 3/1883 | Toombs | 415/4.2 |
| 485,933 | A * | 11/1892 | Herman | 416/119 |
| 1,382,591 | A * | 6/1921 | Ackermann | 415/4.2 |
| 1,396,172 | A * | 11/1921 | Fear | 429/64 |
| 1,966,352 | A | 7/1934 | Mahony | 416/75 |
| 2,240,290 | A * | 4/1941 | Du Brie | 415/4.2 |
| 3,662,610 | A * | 5/1972 | Thoen | 74/10.2 |
| 3,793,530 | A | 2/1974 | Carter | 290/55 |
| 4,012,163 | A | 3/1977 | Baumgartner et al. | 415/208.3 |
| 4,088,419 | A * | 5/1978 | Hope et al. | 415/4.4 |
| 4,115,027 | A * | 9/1978 | Thomas | 415/53.1 |
| 4,134,710 | A * | 1/1979 | Atherton | 416/117 |
| 4,156,580 | A * | 5/1979 | Pohl | 415/4.2 |
| 4,276,816 | A | 7/1981 | Tuley | 454/101 |
| 4,464,579 | A | 8/1984 | Schwarz | 290/44 |
| 4,486,143 | A * | 12/1984 | McVey | 415/164 |
| 4,551,631 | A | 11/1985 | Trigilio | 290/55 |
| 4,606,697 | A * | 8/1986 | Appel | 415/4.4 |
| 4,725,194 | A | 2/1988 | Bartsch | 415/4.2 |
| 4,834,610 | A * | 5/1989 | Bond, III | 415/53.3 |
| 4,864,152 | A * | 9/1989 | Pedersen | 290/53 |
| 5,038,049 | A | 8/1991 | Kato | 290/55 |
| 5,126,584 | A | 6/1992 | Ouellet | 290/55 |

(Continued)

*Primary Examiner*—T C Patel
*Assistant Examiner*—Pedro J Cuevas
(74) *Attorney, Agent, or Firm*—Roylance, Abrams, Berdo & Goodman, L.L.P.

(57) ABSTRACT

A electricity generating assembly includes a plurality of rotatable fan blades. A generator is connected to the plurality of fan blades to convert rotation of the fan blades into electricity. A plurality of shutters surround the plurality of fan blades. The plurality of shutters are movable between a first position in which said plurality of shutters are open to allow access to the plurality of fan blades and a second position in which the plurality of shutters are closed to prevent access to the plurality of fan blades. A motor is connected to the plurality of shutters to move the plurality of shutters between the first and second positions.

59 Claims, 26 Drawing Sheets

U.S. PATENT DOCUMENTS

| | | | | |
|---|---|---|---|---|
| 5,463,257 | A * | 10/1995 | Yea | 290/55 |
| 5,495,128 | A | 2/1996 | Brammeier | 290/55 |
| 5,798,633 | A * | 8/1998 | Larsen et al. | 323/207 |
| 6,106,968 | A | 8/2000 | Johnson | 429/50 |
| 6,158,953 | A | 12/2000 | Lamont | 415/4.4 |
| 6,242,818 | B1 | 6/2001 | Smedley | 290/44 |
| 6,325,687 | B1 * | 12/2001 | Ungerbuehler et al. | 440/82 |
| 6,398,395 | B1 | 6/2002 | Hyun | 362/500 |
| 6,460,450 | B1 | 10/2002 | Sanderson | 92/71 |
| 6,638,005 | B2 | 10/2003 | Holter et al. | 415/4.2 |
| 6,652,221 | B1 * | 11/2003 | Praenkel | 415/3.1 |
| 6,734,576 | B2 * | 5/2004 | Pacheco | 290/55 |
| 6,820,824 | B1 | 11/2004 | Joseph | 239/346 |
| 6,841,894 | B2 * | 1/2005 | Gomez Gomar | 290/55 |
| 6,857,846 | B2 | 2/2005 | Miller | 415/4.2 |
| 6,946,751 | B2 | 9/2005 | Yoshida et al. | 290/44 |
| 6,966,754 | B2 | 11/2005 | Wobben | 416/61 |
| 7,063,579 | B2 | 6/2006 | Voves | 440/3 |
| 7,084,520 | B2 * | 8/2006 | Zambrano et al. | 290/44 |
| 7,105,942 | B2 * | 9/2006 | Henriksen | 290/55 |
| 7,215,039 | B2 * | 5/2007 | Zambrano et al. | 290/55 |
| 7,242,108 | B1 * | 7/2007 | Dablo | 290/55 |
| 7,307,356 | B2 * | 12/2007 | Fraenkel | 290/54 |
| 7,323,791 | B2 * | 1/2008 | Jonsson | 290/55 |
| 7,329,965 | B2 * | 2/2008 | Roberts et al. | 290/55 |
| 7,425,776 | B2 * | 9/2008 | Ketcham | 290/55 |
| 7,566,983 | B1 * | 7/2009 | Lyatkher | 290/54 |
| 7,611,325 | B2 * | 11/2009 | Caldwell | 415/4.1 |
| 7,633,177 | B2 * | 12/2009 | Platt | 290/54 |
| 7,682,127 | B2 * | 3/2010 | Paul | 415/4.2 |
| 7,713,020 | B2 * | 5/2010 | Davidson et al. | 415/1 |
| 7,726,934 | B2 * | 6/2010 | Cowan | 415/4.2 |
| 2003/0156938 | A1 | 8/2003 | Verini | 415/4.2 |
| 2003/0201645 | A1 * | 10/2003 | Pacheco | 290/54 |
| 2004/0226601 | A1 * | 11/2004 | Banister | 136/252 |
| 2005/0236841 | A1 * | 10/2005 | Henriksen | 290/54 |
| 2005/0242590 | A1 * | 11/2005 | Zambrano et al. | 290/44 |
| 2006/0125242 | A1 * | 6/2006 | Fraenkel | 290/54 |
| 2006/0170222 | A1 * | 8/2006 | Zambrano et al. | 290/55 |
| 2006/0232075 | A1 * | 10/2006 | Fraenkel | 290/54 |
| 2006/0244267 | A1 * | 11/2006 | Fraenkel | 290/54 |
| 2010/0135768 | A1 * | 6/2010 | Pitre | 415/7 |

* cited by examiner

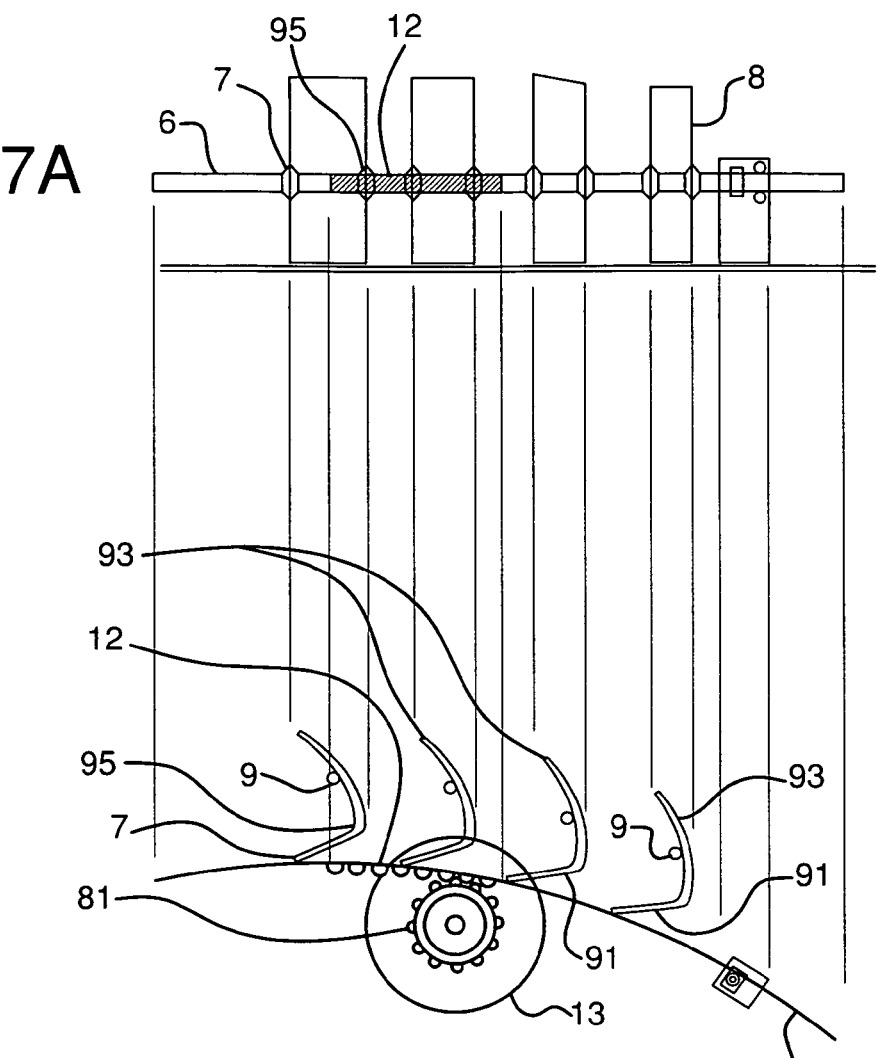
FIG. 7A
FIG. 7B
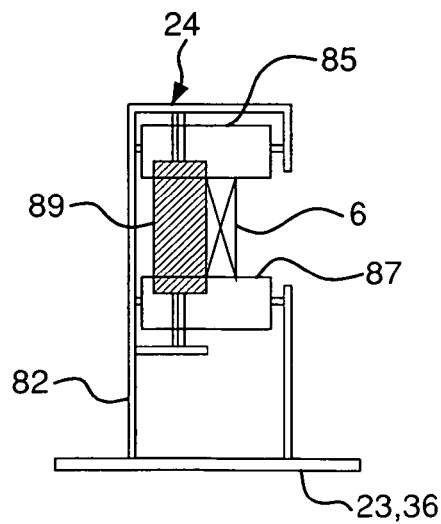
FIG. 8

Flow →

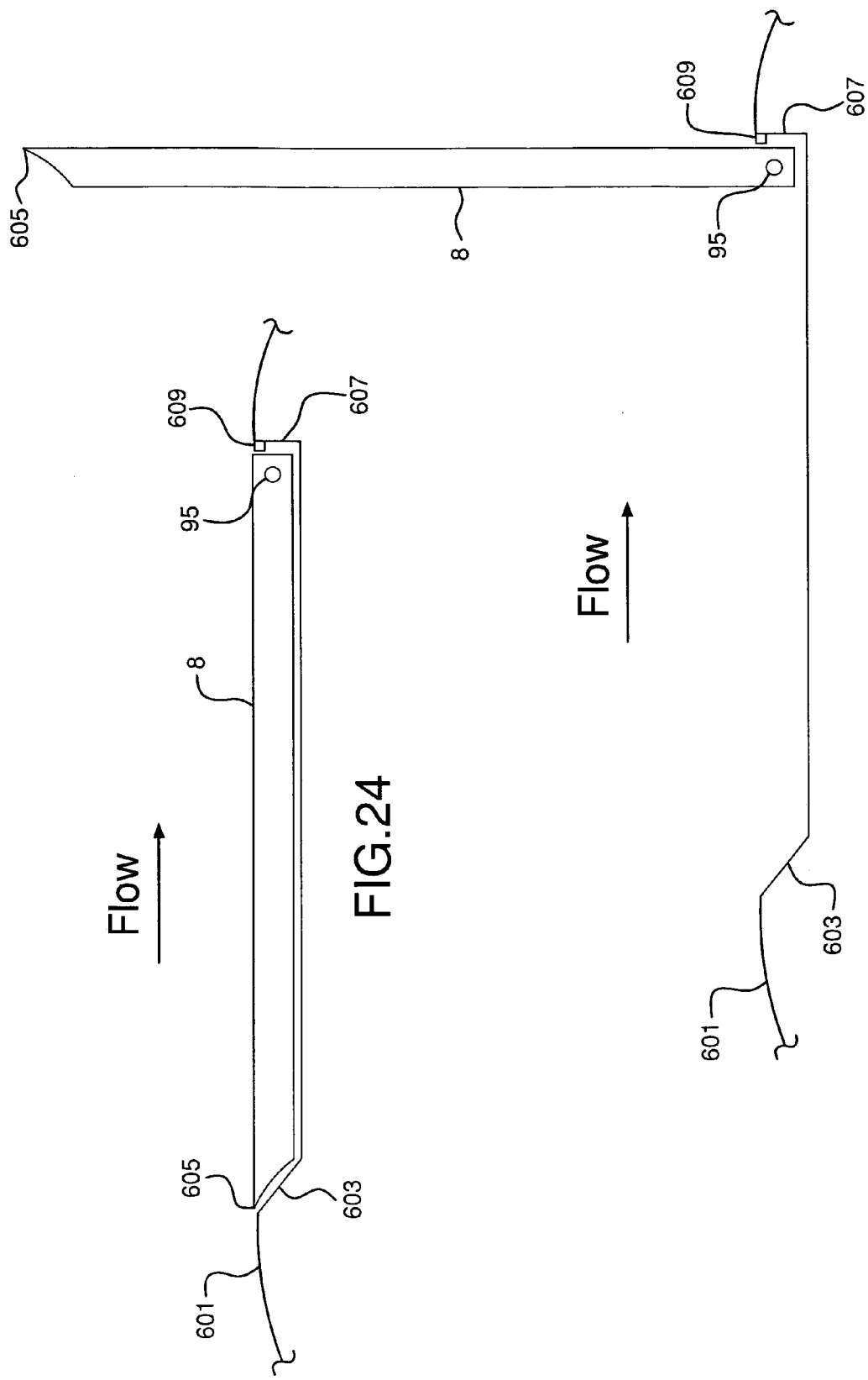

ELECTRICITY GENERATING ASSEMBLY

CROSS REFERENCE TO RELATED APPLICATIONS

This application claims the benefit under 35 U.S.C. §119(e) of provisional application Ser. Nos. 60/849,842, filed Oct. 6, 2006 and 60/915,591, filed May 2, 2007, the entire disclosures of both of which are hereby incorporated by reference.

FIELD OF THE INVENTION

The present invention relates to an electricity generating assembly that utilizes fluid currents or flow to produce electricity. More particularly, the present invention relates to a wind generator assembly having an electrically driven shutter assembly. Furthermore, the present invention relates to a electricity generating assembly that uses water to produce electricity. Still more particularly, the present invention relates to an electricity generating assembly that is remotely operable.

BACKGROUND OF THE INVENTION

Wind generators have long existed in which electricity is produced by rotation of a fan by wind. If the wind generators have no protection or shielding, such that high winds and foreign objects, such as birds, the blades and other internals of the wind generator can be damaged causing loss of power.

Existing wind generators have been provided with shutters to protect blades and other components of the wind generator from possible damage. The shutter assemblies are driven by the wind, such that the shutter assemblies are open until winds occur that are strong enough to close the shutter assemblies.

However, the assemblies of such methods of protecting wind generators often fail to close when subjected to high winds, thereby failing to protect the wind generators. U.S. Pat. No. 177,597 to Ward and U.S. Pat. No. 3,793,530 to Carter describe wind turbine generators having weighted shutters that are closed by wind.

Another problem with existing shuttered wind generators is that closure of the shutters is predetermined at a fixed wind condition, and there is no ability to operate the shutter assemblies under variable conditions.

SUMMARY OF THE INVENTION

It has now been found that by controlling movement of the shutters for an electricity generating assembly by an electronic motor, the shutters may be opened and closed under variable conditions independently of the shutter structure design.

In accordance with the present invention, a fluid-driven electricity generating assembly includes a plurality of rotatable fan blades, a generator connected to the plurality of fan blades to produce electricity based on rotation of the plurality of fan blades, and a plurality of shutters surrounding the plurality of fan blades. The plurality of shutters are movable between a first position in which the plurality of shutters are open to allow access to the plurality of fan blades and a second position in which the plurality of shutters are closed to substantially prevent access to the plurality of fan blades. A motor is connected to the plurality of shutters to move the plurality of shutters between the first and second positions.

The exemplary embodiments of the present invention relate to an electricity generating assembly that generates electricity from wind and/or water currents. The electrically operated shutter assembly prevents high winds, water currents and foreign objects, such as birds, from damaging the fan blades. Additionally, a sensor may be connected to a motor to close the shutters due to high winds or other environmental conditions that could damage the fan blades. Gearing is connected between the motor and the shutter assembly to move the plurality of shutters in unison.

In an exemplary embodiment of the present invention an electricity generating assembly includes a plurality of rotatable fan blades. A generator is connected to the plurality of fan blades to convert rotation of the fan blades into electricity. A plurality of shutters surround the plurality of fan blades. The plurality of shutters are movable between a first position in which said plurality of shutters are open to allow access to the plurality of fan blades and a second position in which the plurality of shutters are closed to substantially prevent access to the plurality of fan blades. A motor is connected to the plurality of shutters to move the plurality of shutters between the first and second positions.

In another exemplary embodiment of the present invention, a method of generating electricity includes providing an electricity generating assembly having a plurality of shutters surrounding a plurality of rotatable fan blades. The plurality of shutters are moved to a first position to subject the plurality of fan blades to a fluid current to rotate the plurality of fan blades to generate electricity. The plurality of shutters are moved to a second position to interrupt the fluid current access to the plurality of fan blades. The plurality of shutters are moved to a more open position after the sensor determines normal conditions.

According to another embodiment of the present invention, a pole-mounted wind generator assembly is provided in which the gearing is disposed between the fan blades and the generator. A further embodiment involves a stand-alone wind generator assembly in which the generator may be disposed within the fan blades and directly connected to a shaft to which the fan blades are connected. Alternatively, the generator for the stand-alone wind generator may be disposed outside of the fan blades, either connected to the fan blade shaft or offset from the fan blade rotation axis to increase the number of revolutions of the generator by a revolution of the fan blades. The stand-alone wind generator assemblies may be disposed in any desired location, such as a hilltop, rooftop or open field.

Another advantage provided by the wind generator assembly according to the exemplary embodiments of the present invention is the ability to easily spread the production of electricity over a wide geographic area. Rather than relying on a single, central location for the supply of electricity, the present self-contained wind generator assemblies may be widely dispersed over a geographic area. An event that would shut down a single location supplying electricity, such as a tornado, hurricane or terrorist strike, would only minimally impact a widely dispersed wind generator assembly system according to exemplary embodiments of the present invention.

Objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and other features and advantages of the present invention will become more apparent by describing in detail exemplary embodiments thereof with reference to the attached drawings, in which:

FIG. 7A is an elevational view of a shutter control band and shutters of FIG. 3;

FIG. 7B is a top plan view of the shutter control band of FIG. 7A, including a shutter motor and shutter drive gear;

FIG. 8 is an elevational view in partial cross section of a shutter bearing assembly of FIG. 3, including a shutter control band;

FIGS. 24-26 are side elevational views of a shutter in open and closed positions;

Throughout the drawings, like reference numerals will be understood to refer to like parts, components and structures.

DETAILED DESCRIPTION OF EXEMPLARY EMBODIMENTS

The present invention is described more fully with reference to the accompanying drawings, in which exemplary embodiments of the invention are shown. The present invention may, however, be embodied in many different forms and should not be construed as being limited to the exemplary embodiments set forth herein; rather, these exemplary embodiments are provided so that this disclosure is thorough and complete, and conveys the concept of the invention to those skilled in the art.

Figure 1:
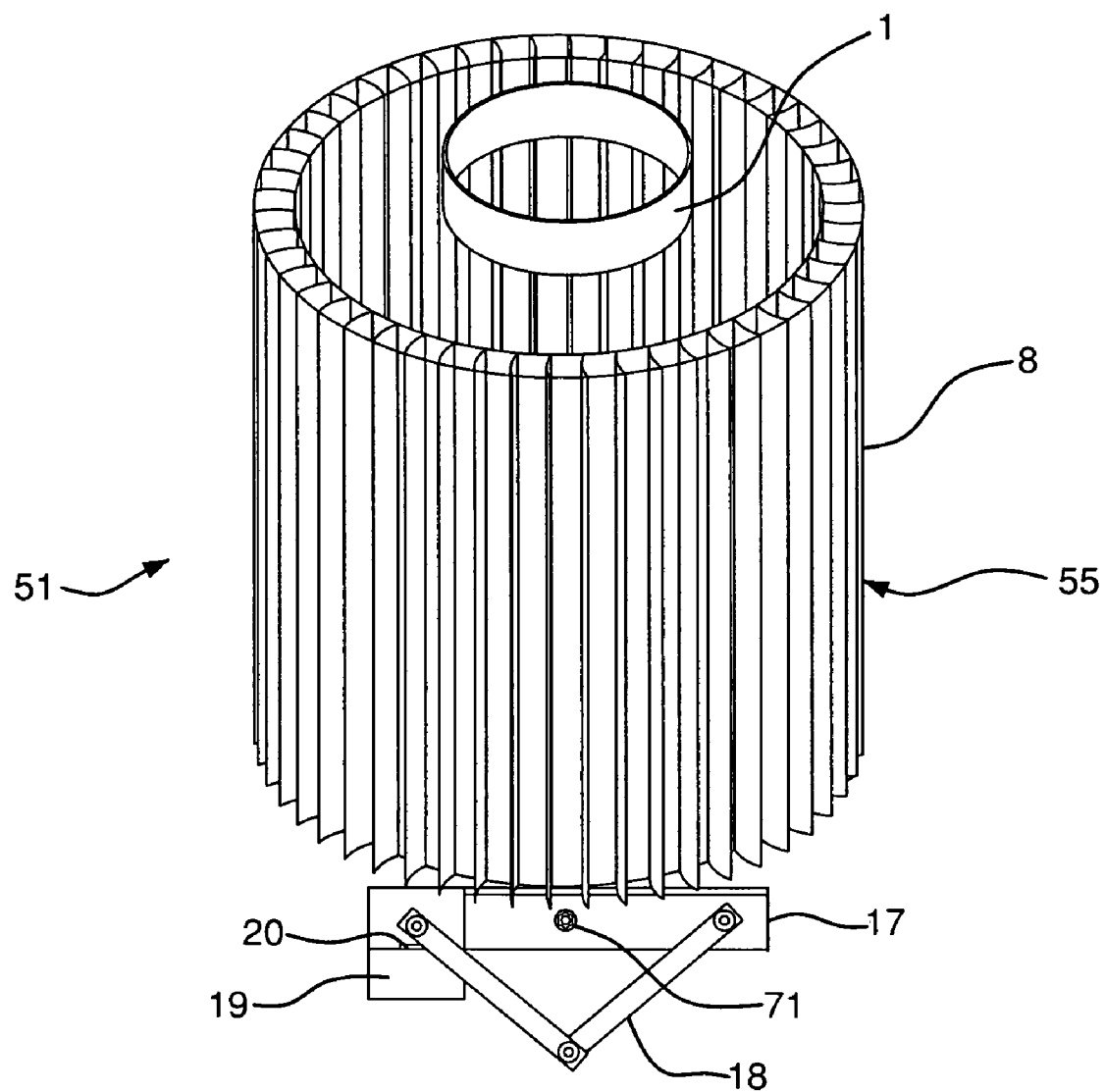
FIG. 1 is a perspective view of an electricity generating assembly according to an exemplary embodiment of the present invention.
Figure 2:
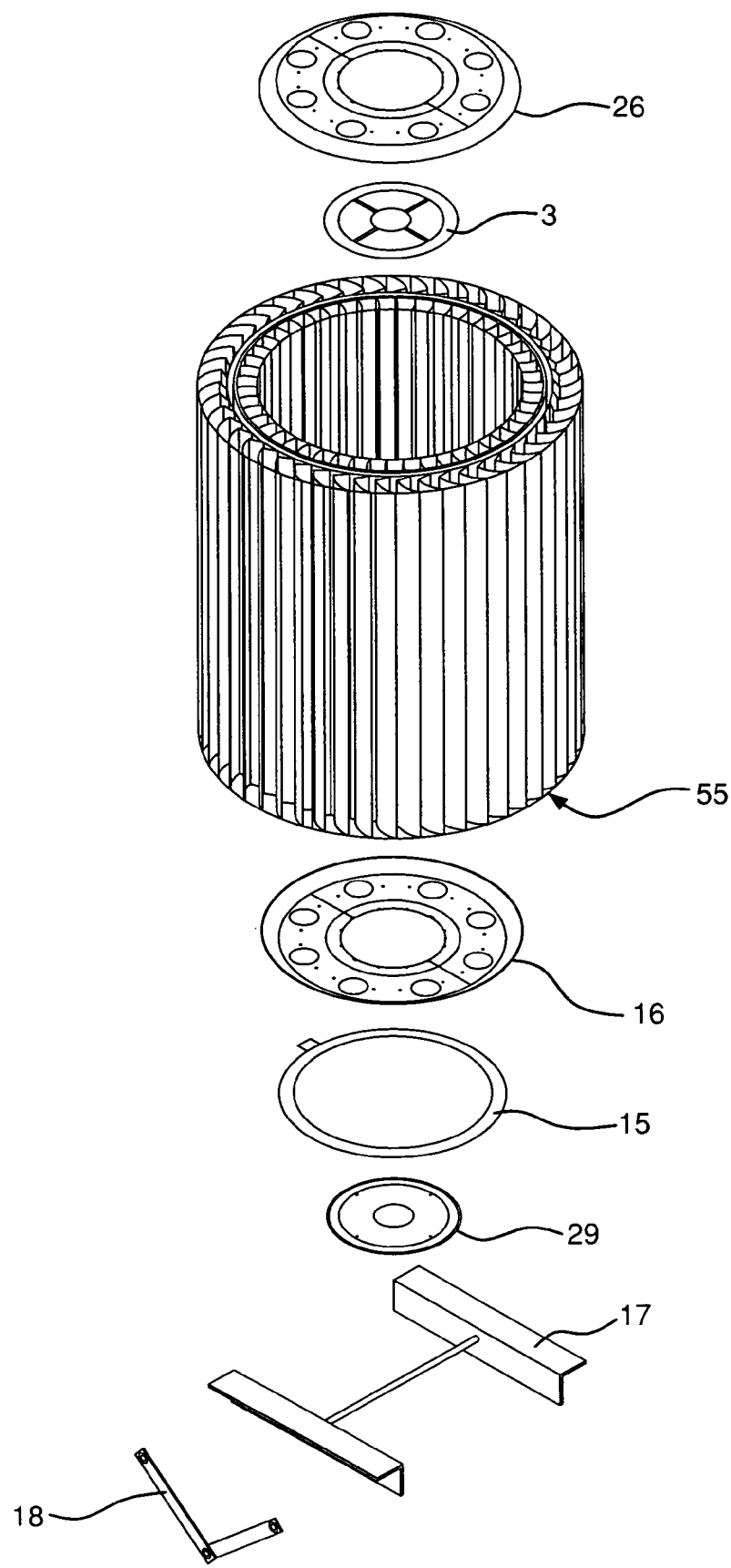
FIG. 2 is an exploded perspective view of the electricity generating assembly of FIG. 1.
Figure 3:
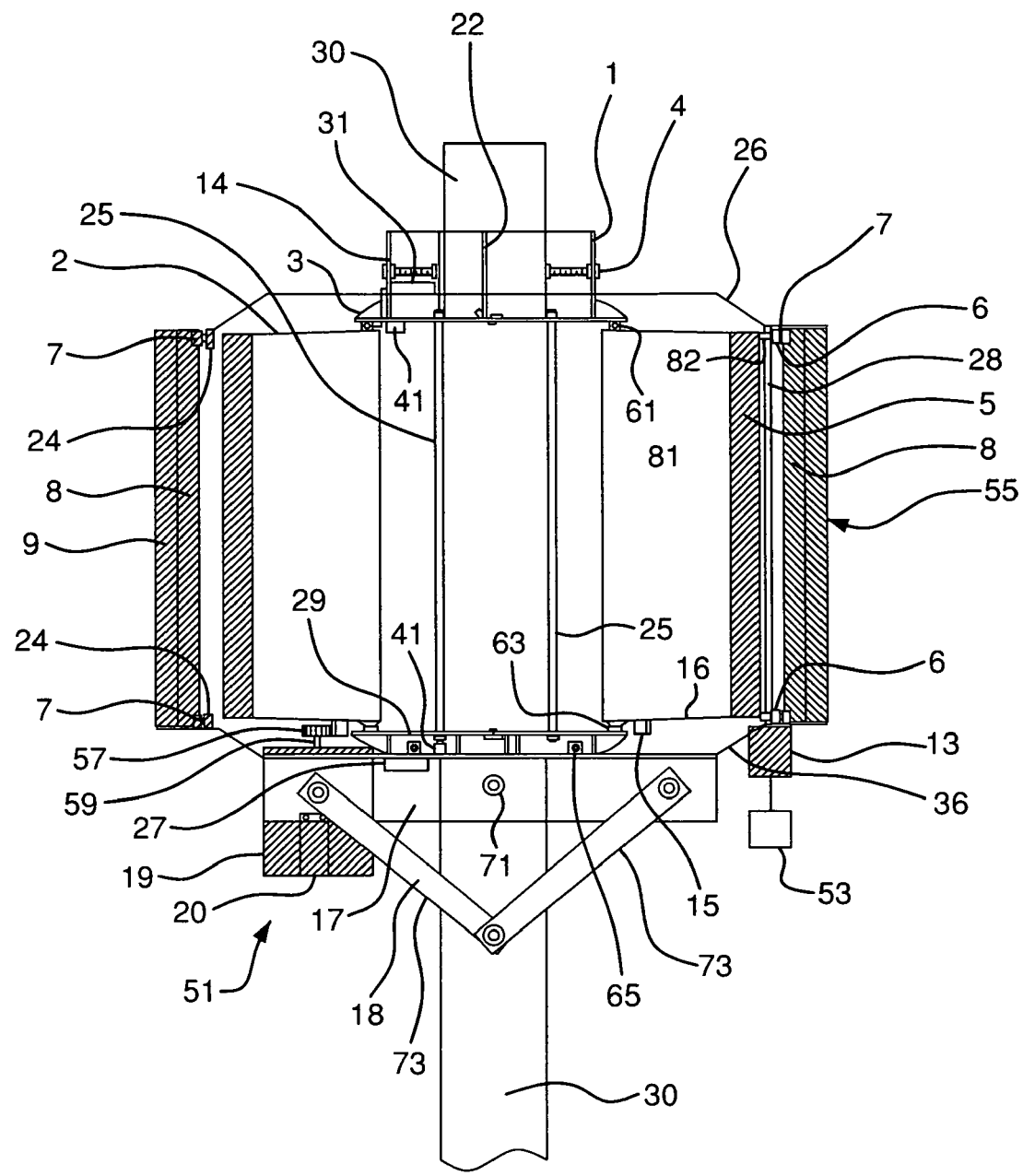
FIG. 3 is an elevational view in partial cross section of an electricity generating assembly according to an exemplary embodiment of the present invention.
Figure 4:
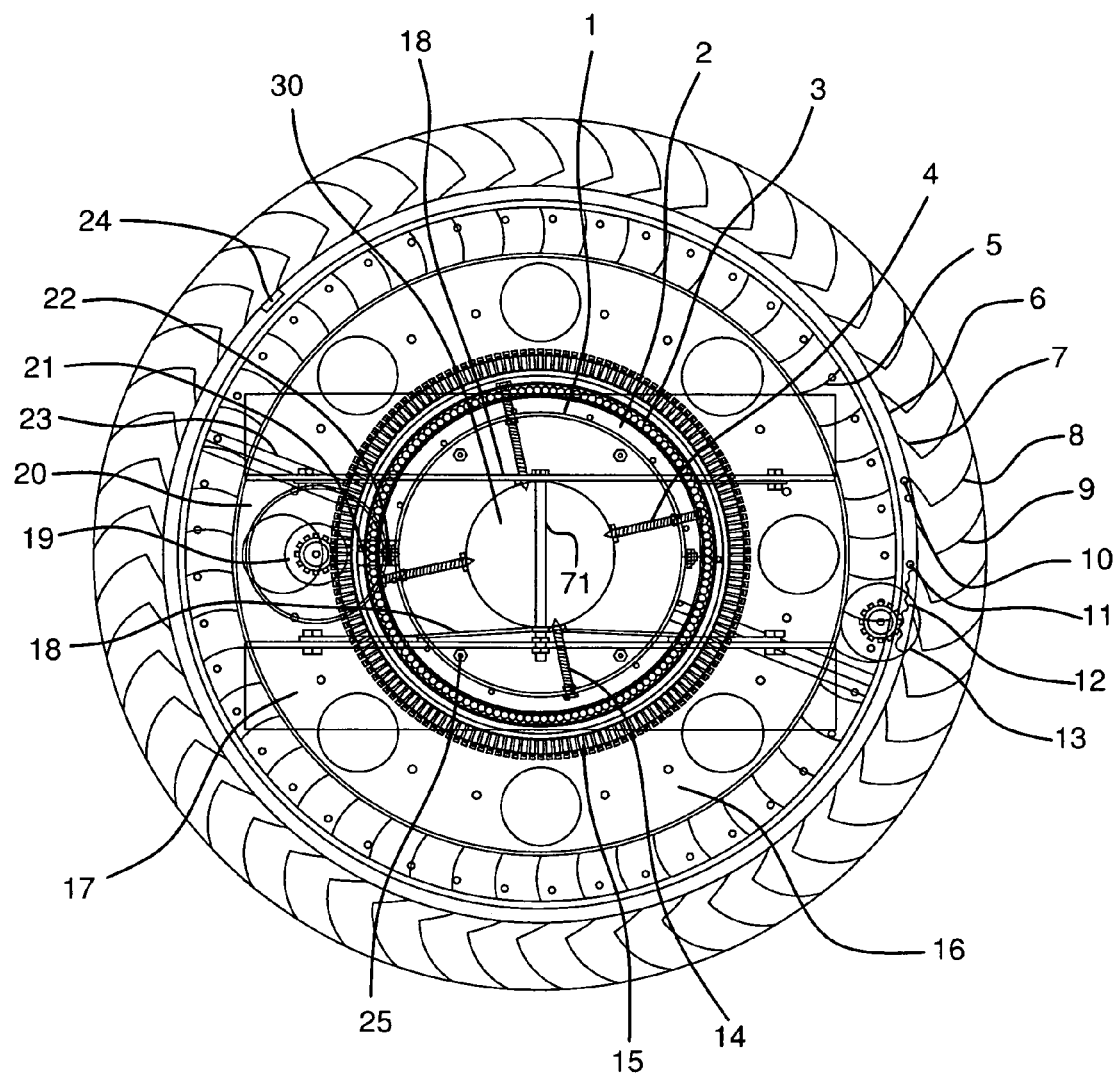
FIG. 4 is a bottom plan view of the electricity generating assembly of FIG. 3.
Figure 6:
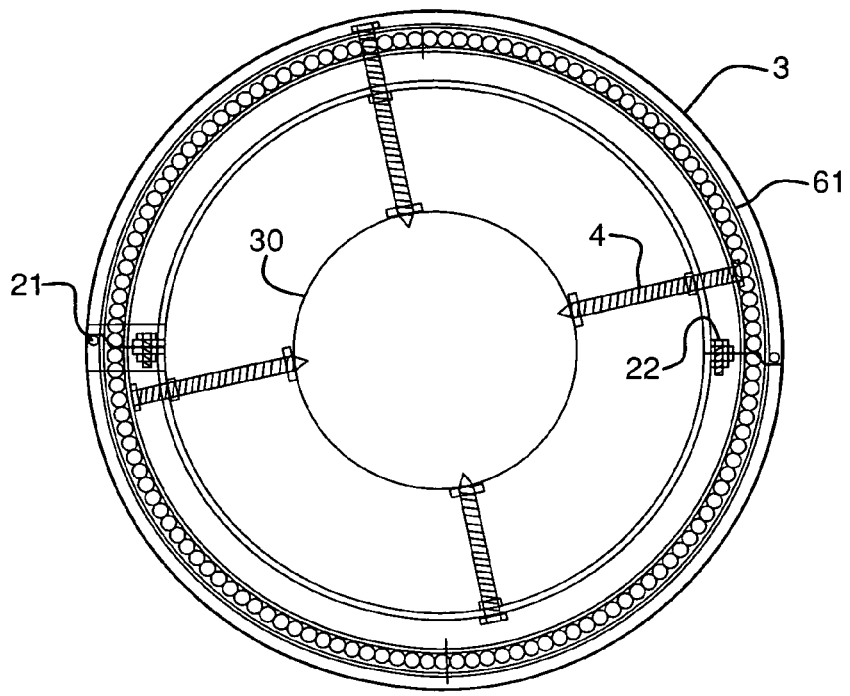
FIG. 6 is a top plan view of an upper bearing plate and upper bearing assembly of FIG. 3.

In a first exemplary embodiment of the present invention, the electricity generating assembly 55 is mounted to a pole 30 and the generator 19 is disposed externally of the plurality of fan blades 5, as shown in FIGS. 1 and 3. The generator 19 may include a gear box, transmission, and/or other suitable gear and power transmitting assemblies As shown in FIGS. 1-4, the electricity generating assembly 55 is mounted to a support, such as a telephone pole 30. A plurality of fan blades 5 are disposed between an upper bearing plate 3 and a lower bearing plate 29. An upper fan blade assembly 61 is disposed between the plurality of fan blades 5 and the upper bearing plate 3 and a lower fan blade assembly 63 is disposed between the plurality of fan blades 5 and the lower bearing plate 29, thereby facilitating rotation of the fan blades. An upper bearing lubricator 31 and a lower bearing lubricator 27 are connected to the upper and lower bearing assemblies 61 and 63, respectively, as shown in FIG. 3 to lubricate the bearing assemblies. Portions of the upper and lower bearing plates 3 and 29 may be connected by a splice 21, as shown in FIGS. 4 and 6. A generator drive gear 15 is secured to the lower end of the plurality of fan blades, as shown in FIGS. 2-4.

Figure 5:
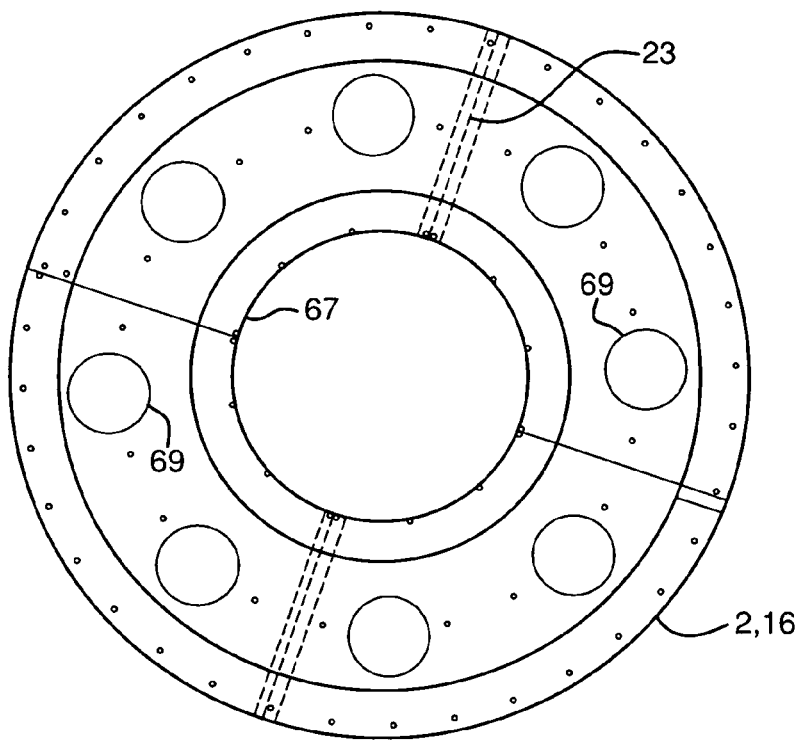
FIG. 5 is a top plan view of a fan plate of FIG. 3.

A lower fan plate 16 is connected to a lower end of the plurality of fan blades 5, as shown in FIGS. 2-4. As shown in FIG. 5, the lower fan plate 16 has an opening 67 to receive the pole 30. A plurality of air openings 69 in the lower fan plate 16 allow air that has passed through the plurality of fan blades 5 to exit the electricity generating assembly 55. A generator drive gear 15 is secured to the lower fan plate 16, as shown in FIG. 3. The lower fan blade bearings 63 are preferably disposed between the lower fan plate 16 and the lower bearing plate 29. As shown in FIGS. 4 and 5, a splice 23 may be used to join portions of the lower fan plate 16.

A lower cover 36 is connected between the lower bearing plate 29 and a mounting bracket 17, as shown in FIGS. 2 and 3. Preferably, a plurality of brackets 65 secure the lower cover 36 between the lower bearing plate 29 and the mounting bracket 17.

The mounting bracket 17 is secured to the support 30, as shown in FIGS. 1-4, by a fastener, which passes entirely through the support 30. A brace assembly 18 is secured to the mounting bracket 17 at opposite ends of the fastener 71. The brace assembly 18 has a plurality of arms 73 to further secure the electricity generating assembly 55 to the support 30.

The generator 19 is secured to the mounting bracket 17 by a generator mounting bracket 20, as shown in FIGS. 3 and 4. A generator shaft 59 is rotatably connected to the generator 19 and has a gear 57 at the exposed end of the generator shaft. The gear 57 engages the generator drive gear 15 such that rotation of the plurality of fan blades 5 results in rotation of the generator shaft, thereby generating electricity. The generator drive gear 15 may be connected to the fan blades at any suitable position. Disposing the generator drive gear 15 at an outer edge of the fan blades would provide more revolutions of the generator gear shaft per revolution of the fan blades than disposing the generator drive gear closer to an inner edge as shown in FIG. 3. Additional gears may be disposed between the generator drive gear 15 and the generator gear 57, thereby effecting the number of revolutions of the generator shaft per revolution of the fan blades.

An upper fan plate 2 is connected to an upper end of the plurality of fan blades 5, as shown in FIGS. 2-4. As shown in FIG. 5, the upper fan plate 2 is substantially identical to the lower fan plate 16, and has an opening 67 to receive the pole 30. A plurality of air openings 69 in the lower fan plate 16 allow air that has passed through the plurality of fan blades 5 to exit the electricity generating assembly 55. The upper fan blade bearings 61 are preferably disposed between the upper fan plate 2 and the upper bearing plate 3. As shown in FIGS. 3 and 5, a splice 23 may be used to join portions of the upper fan plate 2.

An upper fan cover 26 is connected between the upper bearing plate 3 and a top mounting assembly 1, as shown in FIGS. 2 and 3. Preferably, a plurality of brackets 65 secure the upper bearing plate 3, the top mounting assembly 1 and the upper fan cover 26. A plurality of fasteners 4 and nuts 14 secure the top mounting assembly 1 to the support 30, as shown in FIGS. 3 and 4.

A plurality of stabilizer rods 25 are connected between the upper and lower bearing plates 3 and 29 to stably support the wind generator assembly 5 on the support 30.

Figure 9:
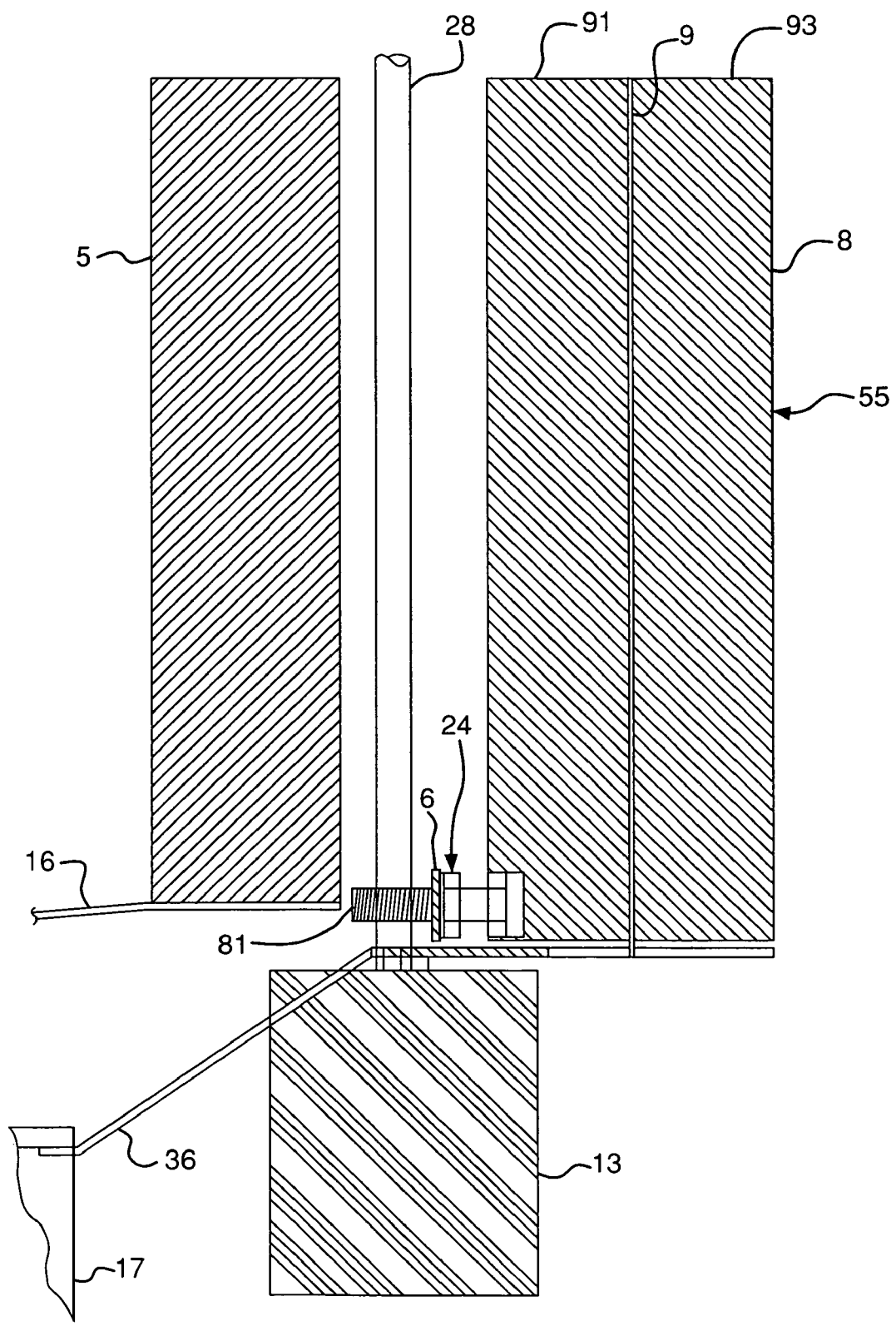
FIG. 9 is an enlarged view of the shutter bearing assembly and shutter drive shaft and shutter drive gear of FIG. 3.

A shutter drive rod 28 extends upwardly from the shutter drive motor 13, which is connected to lower fan cover 36, as shown in FIGS. 4 and 9. An upper end of the shutter drive rod 28 is rotatably received by the upper fan cover 26. A shutter drive gear 81 is connected to the shutter drive rod 28, as shown in FIGS. 7B and 9. A shutter control band 6 is disposed is a shutter bearing assembly 24, as shown in FIGS. 8 and 9. A portion 12 of the shutter control band 6 has teeth that engage the shutter drive gear 81. Thus, rotation of the shutter drive gear 81 by the shutter drive motor 13 results in rotation of the shutter control band 6, thereby moving the shutter assembly 55 between open and closed positions. The motor 13 is preferably battery powered, but may be powered in any suitable method, such as solar powered or powered by the generator 19.

The shutter bearing assembly 24 includes first and second bearings 85 and 87 rotatably disposed within the bearing housing 82, as shown in FIG. 8. A third bearing 89 is rotatably disposed within the bearing housing 82 such that its rotation axis is substantially perpendicular to the rotation axes of the first and second bearings 85 and 87. The shutter control band 6 is rotatably received within the bearing housing 82 by the first, second and third bearings 85, 87 and 89 to facilitate rotation of the shutter control band 6. As shown in FIG. 3, first and second shutter drive gears 81 and 82 may be disposed proximal first and second ends of the shutter drive rod 28. A pair of substantially similar shutter bearing assemblies 24, including shutter control bands 6, are disposed to engage the first and second shutter drive gears.

Figure 16:
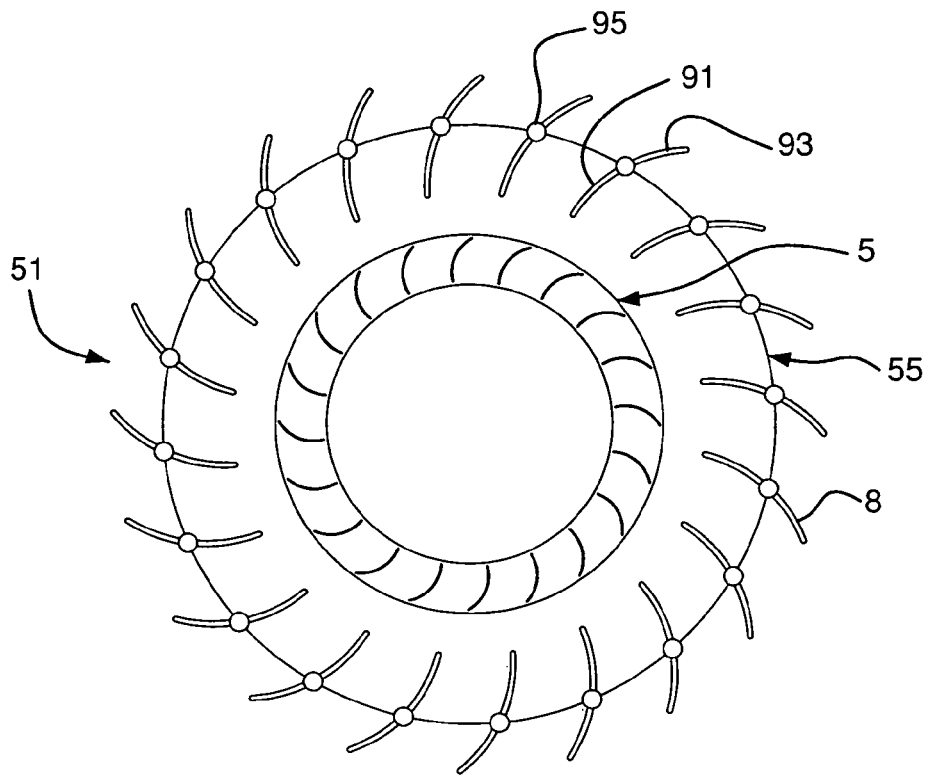
FIG. 16 is a top plan view of an electricity generating assembly in which the shutter assembly is mounted further away from the plurality of fan blades.

As shown in FIGS. 7A and 7B, the shutters 8 of the shutter assembly are connected by hinge pins 7 to the shutter control band 6. As shown in FIGS. 7B and 9, the shutters 8 may have a first portion 91 and a second portion 93 rotatably connected by a hinge 95. A hinge 7 rotatably connects the first portion 91 of the shutter 8 to the shutter control band 6. As shown in FIG. 3, upper and lower hinges 7 and 95 are used when the wind generator assembly 51 has upper and lower shutter control bands 6. As shown in FIG. 16, the shutter assembly 55 may be disposed further away from the plurality of fan blades 5, thereby allowing for the use of larger shutters 8. A larger shutter 8 allows the electricity generating assembly 51 to capture more wind. Moreover, the larger shutter 8 reduces the static pressure within the electricity generating assembly 51, thereby reducing drag and increasing the efficiency of the wind generator assembly. Additionally, a larger shutter 8 has more surface area that may be utilized for electricity generation, such as by disposing a solar device thereon. For example, solar tape may be disposed on the shutters 8, thereby allowing electricity to be generated from captured sunlight, in addition to generating electricity from captured wind.

A shutter pivot rod 9 is connected between the upper and lower fan covers 26 and 36, as shown in FIGS. 3 and 9. A shutter pivot rod 9 is used for each shutter 8. The shutter pivot rod 9 guides the second portion 93 of each shutter 8 as the shutter moves between open and closed positions, as shown in FIG. 7B. Shutter stops 10 and 11 are disposed on the shutter control band 6 to prevent rotation of the shutter gear 81 beyond the fully opened and fully closed positions.

A sensor 53 may be connected to the motor 13 to cause the motor to open and close the shutter assembly 55. The sensor 53 may be disposed to sense rotation of the plurality of fan blades 5 or to measure wind speed. The sensor 53 sends an appropriate signal to the motor 13 to open or close the shutter assembly 55 in response to the sensed value. Alternatively, the sensor 53 may be remotely controlled, such as by a global positioning system (GPS), to remotely open and close the shutter assembly 55 as desired.

Heat sensors 41, as shown in FIG. 3, may be disposed proximal the upper and lower fan blade bearings 61 and 63 such that the sensors detect overheating of the bearings that may lead to malfunction of the wind generator assembly 51. Heat sensors may also be disposed proximal any other bearing assemblies, gearing or motors of the wind generator assembly 51 to detect overheating thereof. The heat sensors may be remotely monitored, such as through a GPS system, so that a malfunctioning electricity generating assembly is quickly known and repair thereof may be initiated.

Figure 10A:
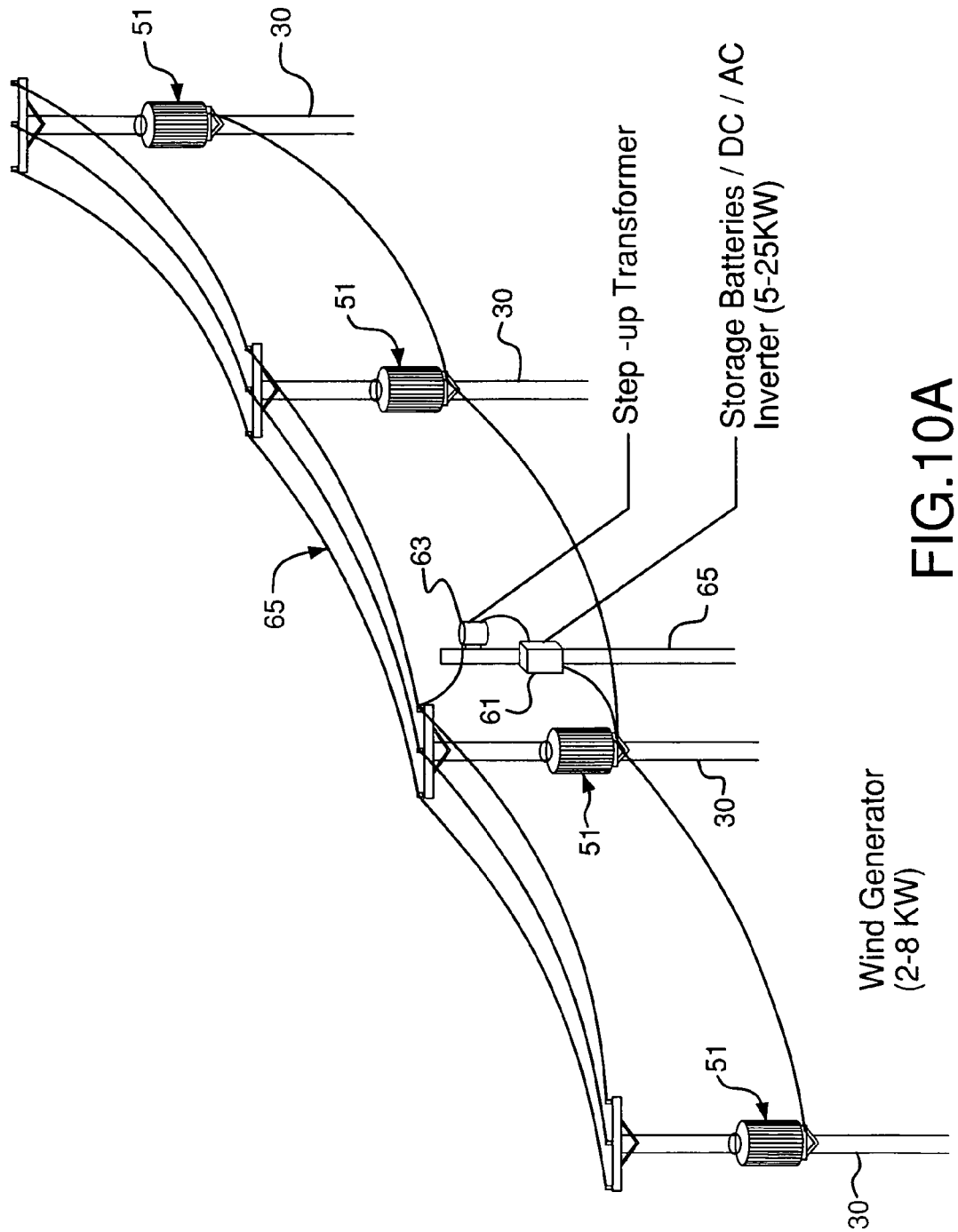
FIGS. 10A and 10B are schematic illustrations of a plurality of electricity generating assemblies connected to a power distribution system.
Figure 10B:
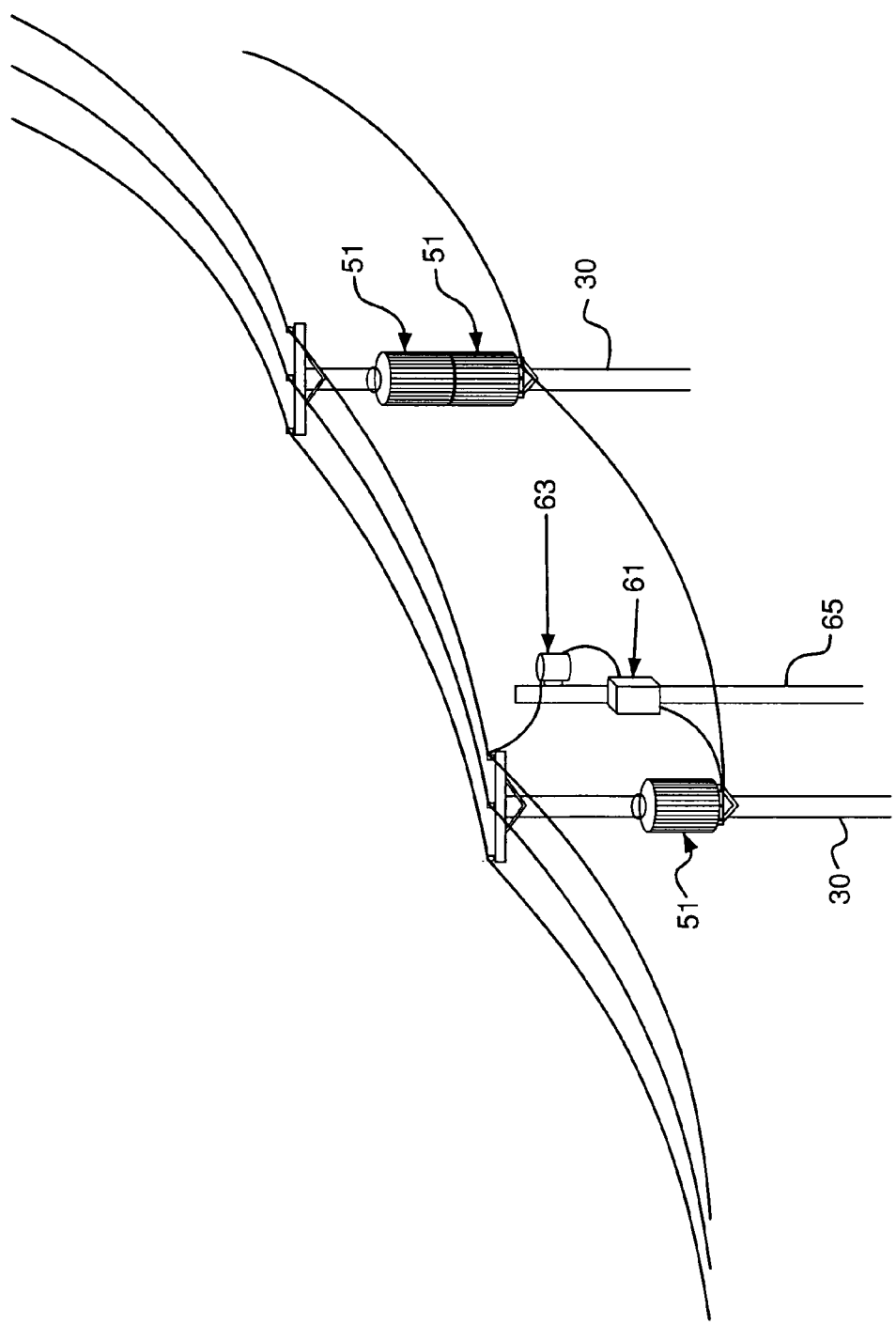

The wind generator assembly 51 is connected to a battery 61 for storage of generated electricity, as shown in FIGS. 10A and 10B. A plurality of electricity generating assemblies 51 may be connected to a single battery 61. A plurality of electricity generating assemblies 51 may be connected on a single support 30, as shown in FIG. 10B, to further increase the generation of electricity. Electricity is transferred from the battery 61 to a step-up transformer 63. Preferably, the battery 61 and the transformer are connected to a support 65. The transformer 63 is connected to an electrical distribution system 65 to provide a back-up power supply.

Figure 11:
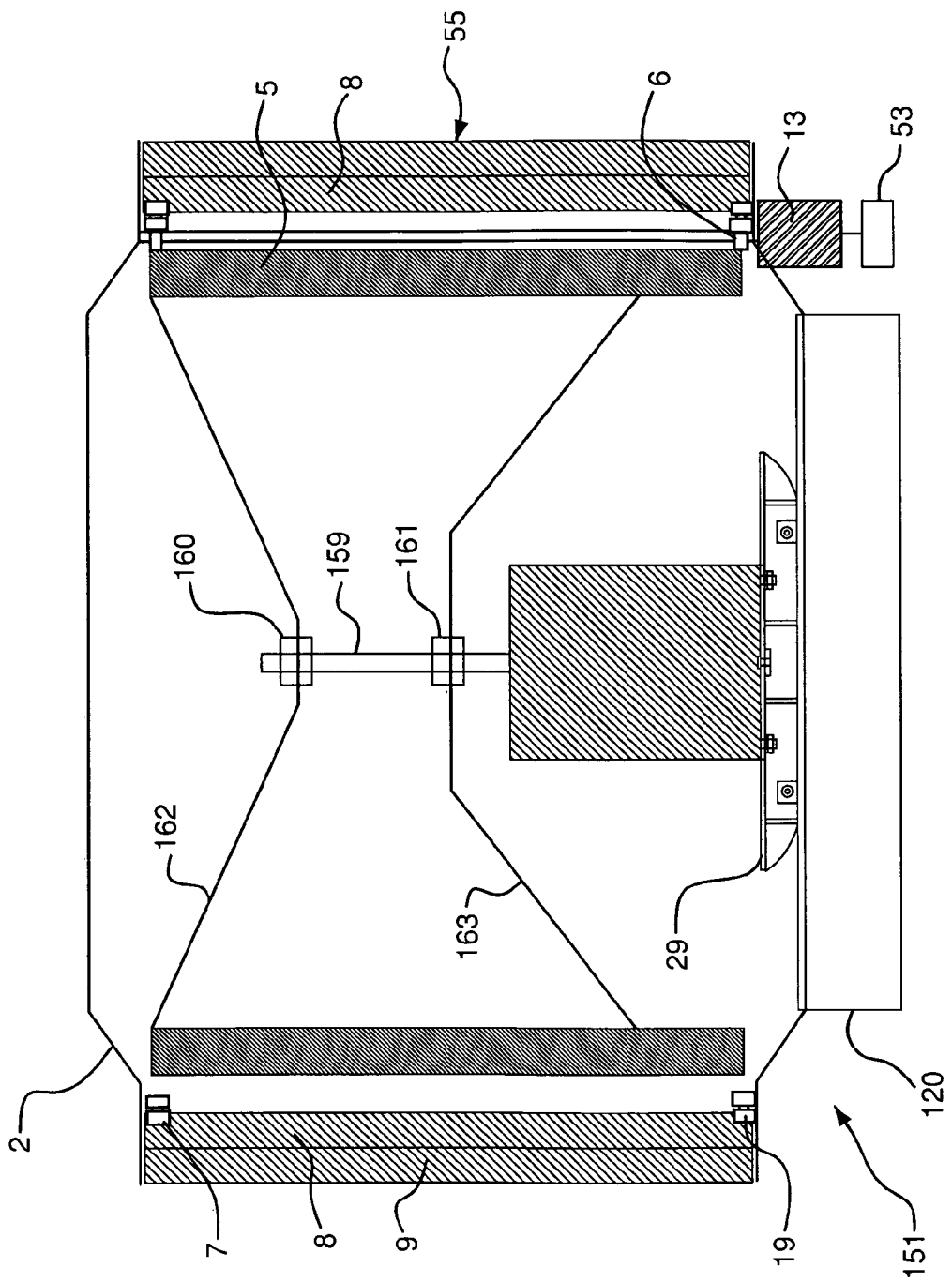
FIG. 11 is an elevational view in partial cross section of an electricity generating assembly according to another exemplary embodiment of the present invention in which a generator is disposed within a plurality of fan blades.

In another exemplary embodiment of the present invention, the generator 19 of the electricity generating assembly 151 is mounted within the plurality of fan blades 5, as shown in FIG. 11. The plurality of fan blades 5 are connected to the generator shaft 159 instead of using a generator drive gear 15 (FIG. 1). Mounting members 162 and 163 are connected to the plurality of fan blades 5 at opposite ends thereof, and a central portion of the mounting members are connected by mounting assemblies 160 and 161 to the gear shaft 159. Thus, rotation of the plurality of fan blades 5 results in rotation of the generator shaft 159, thereby generating electricity. The generator 19 is secured to the bottom bearing plate 29, which is secured to the mounting platform 120. The mounting platform 120 allows the electricity generating assembly 151 to be used as a free-standing unit.

Figure 15:
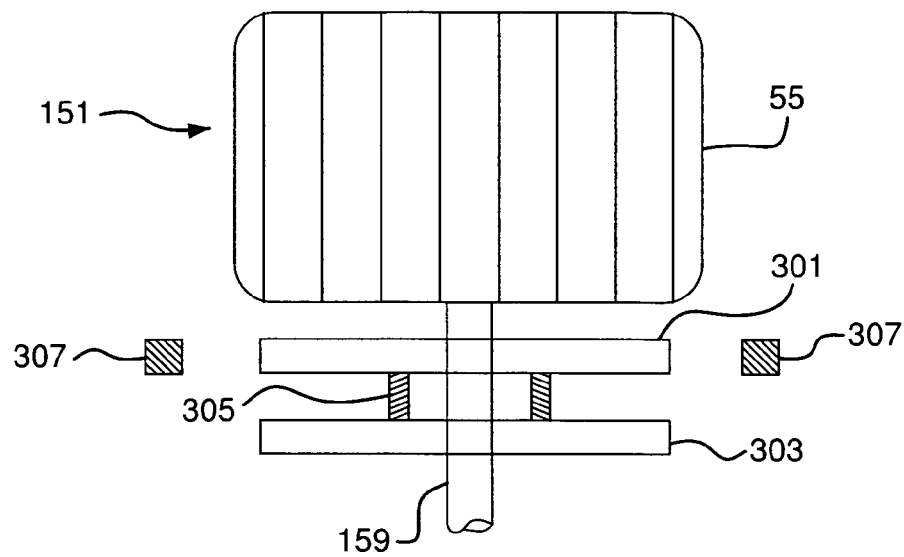
FIG. 15 is an elevational view of an electricity generating assembly having a weighted wheel mounted on a generator shaft.

In another exemplary embodiment of the present invention, a weighted wheel 301 may be mounted on the generator shaft 159 to facilitate rotation, as shown in FIG. 15. The weighted wheel 301 imparts centrifugal momentum to the shaft 159, thereby facilitating rotation. A motor, similar to motor 13 shown in FIG. 11, may be connected to the plurality of fan blades 5 to facilitate starting rotation of the fan blades. Once sufficient momentum has been established to continue rotation of the fan blades 5, the motor may be disengaged. Additional wheels may be added to further impart momentum to the generator shaft 159. Furthermore, a gear assembly 305 may be disposed between first and second wheels 301 and 303 to cause the wheels to rotate in opposite directions, thereby substantially preventing any instability from being imparted to the shaft 159.

In another exemplary embodiment, a weighted wheel 301 is wired to act as an armature. A magnet 307 is disposed outside the wheel 303. Electricity is generated by the rotation of the wired wheel 301 in the magnetic field created by the magnet 307. The electricity generated by the wired wheel and magnet supplements the electricity generated by the fan blades. In still another exemplary embodiment, one wheel 301 may be wired to act as an armature, and the other wheel 303 may have a magnet such that electricity is generated by the rotation of the wheels in opposite directions.

Figure 12:
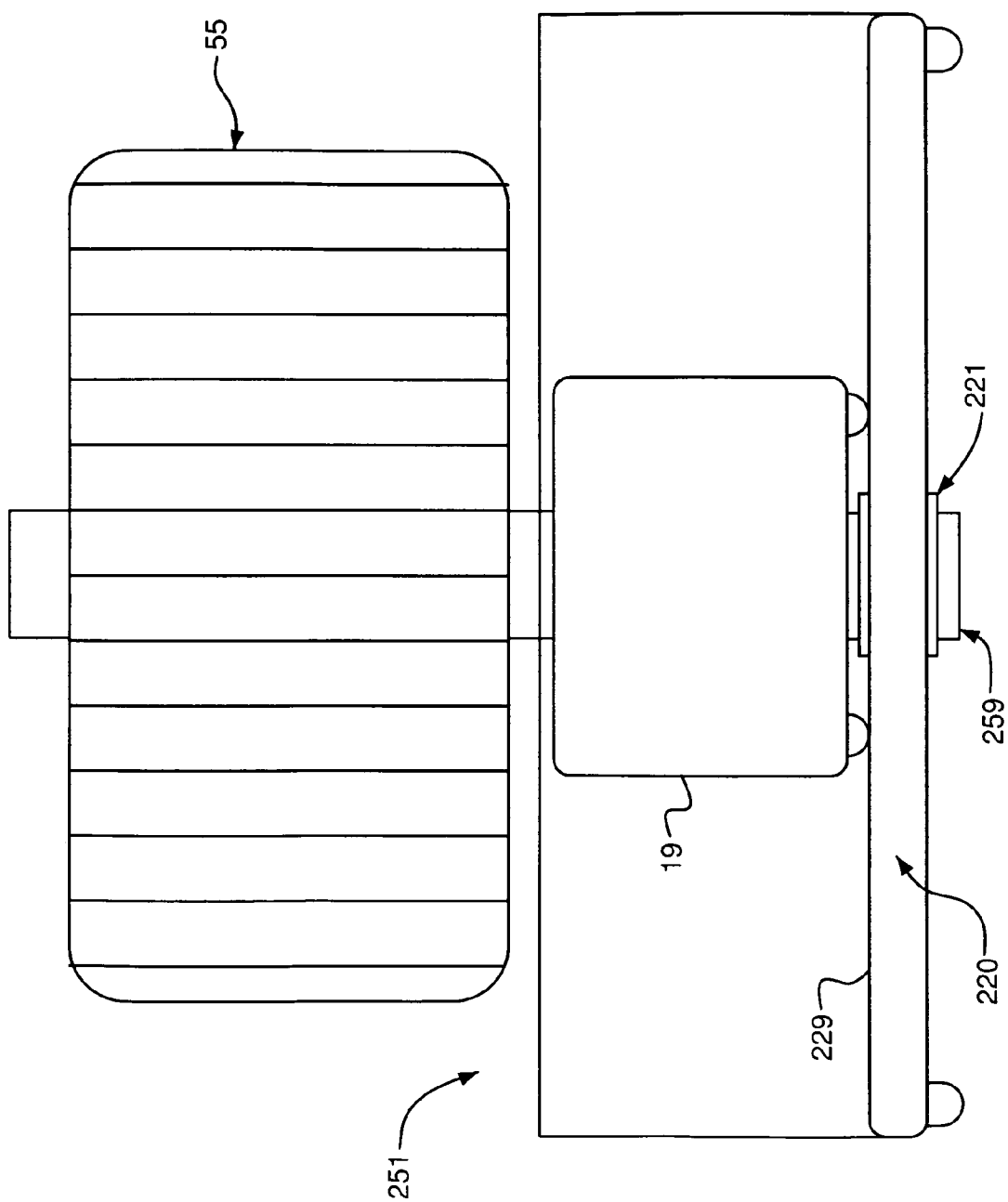
FIG. 12 is an elevational view of an electricity generating assembly according to another exemplary embodiment of the present invention in which a generator is disposed externally of a plurality of fan blades.
Figure 13:
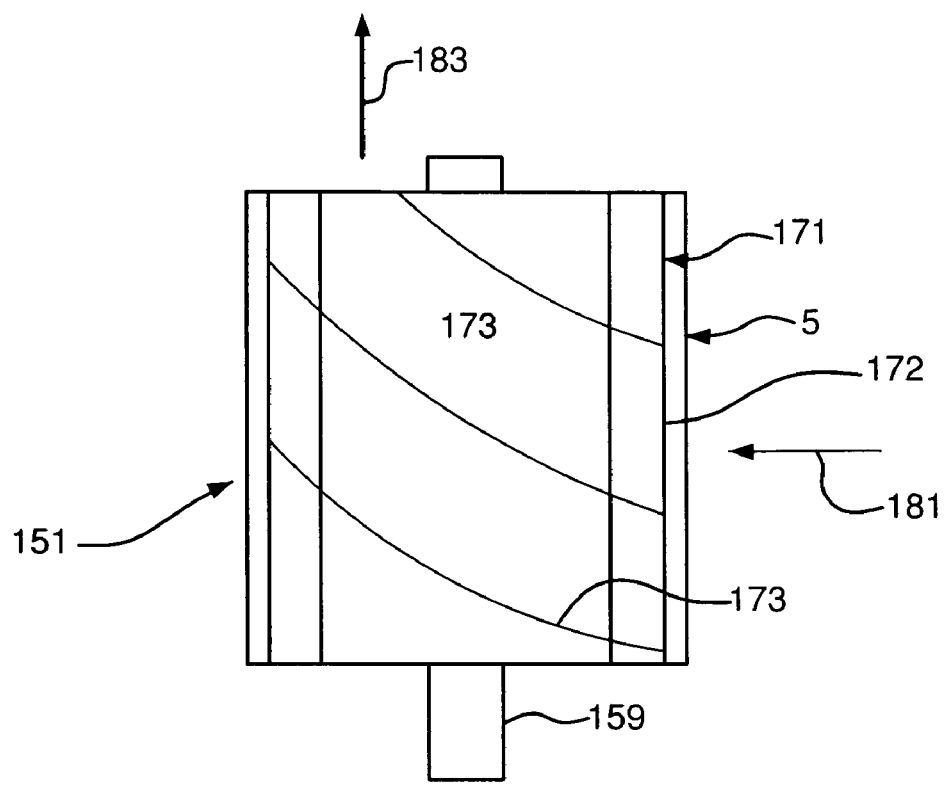
FIG. 13 is an elevational view of an electricity generating assembly including an air flow control assembly.
Figure 14:
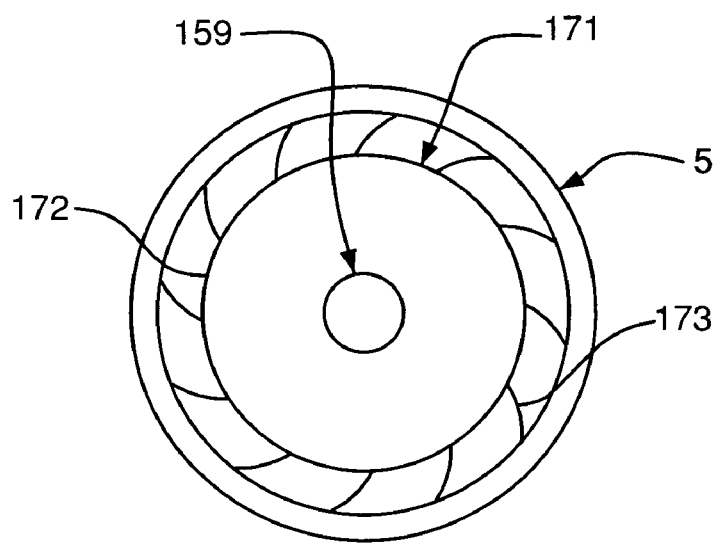
FIG. 14 is a top plan view of the electricity generating assembly of FIG. 13.

As shown in FIGS. 13 and 14, the electricity generating assembly 151 may include an air flow control assembly 171 disposed within the plurality of fan blades 5. The air flow control assembly includes a cylinder 172 to which a plurality of blades 173 are attached. The cylinder 172 may be connected to the shaft 159 in a similar manner as the plurality of fan blades 5, or may be connected to the electricity generating assembly 151 in any other suitable manner. The blades 173 direct incoming air 181 passing through the plurality of fan blades 5 out the top of the electricity generating assembly 151, as indicated by air flow arrow 183. This substantially prevents air from being trapped within the electricity generating assembly, which leads to creating drag on the generator such that the electricity generating assembly loses efficiency. Thus, by redirecting air out of the electricity generating assembly 151, the efficiency is increased. The wind control assembly 171 may be similar installed in the electricity generating assembly 51 of FIG. 3 and the electricity generating assembly 251 of FIG. 12.

In another exemplary embodiment of the present invention, the generator 19 of the electricity generating assembly 251 is mounted externally of the plurality of fan blades and connected to the generator shaft 259, as shown in FIG. 12. The plurality of fan blades may be connected to the generator shaft 259 in a substantially similar manner as shown in FIG. 11. The plurality of fan blades are connected to the generator shaft 259, instead of using a generator drive gear 15 (FIG. 1), such that rotation of the plurality of fan blades 5 results in rotation of the generator shaft 259, thereby generating electricity. The generator 19 is mounted on a bearing plate 229 of a housing 220. A bottom plate bearing 221 rotatably secures the generator shaft 259 to the bottom bearing plate 229 of the housing 220. Thus, the electricity generating assembly 259 may be used as a free-standing unit. Alternatively, the electricity generating assembly 251 may be connected to the plurality of fan blades by a gearing assembly substantially similar to the exemplary embodiment shown in FIG. 3. Thus, because the generator 19 is not axially connected by a shaft to the plurality of fan blades, that is, the axis of the fan blades and the axis of the generator are offset, the number of revolutions of the generator shaft per a single revolution of the plurality of fan blades is increased.

Figure 31:
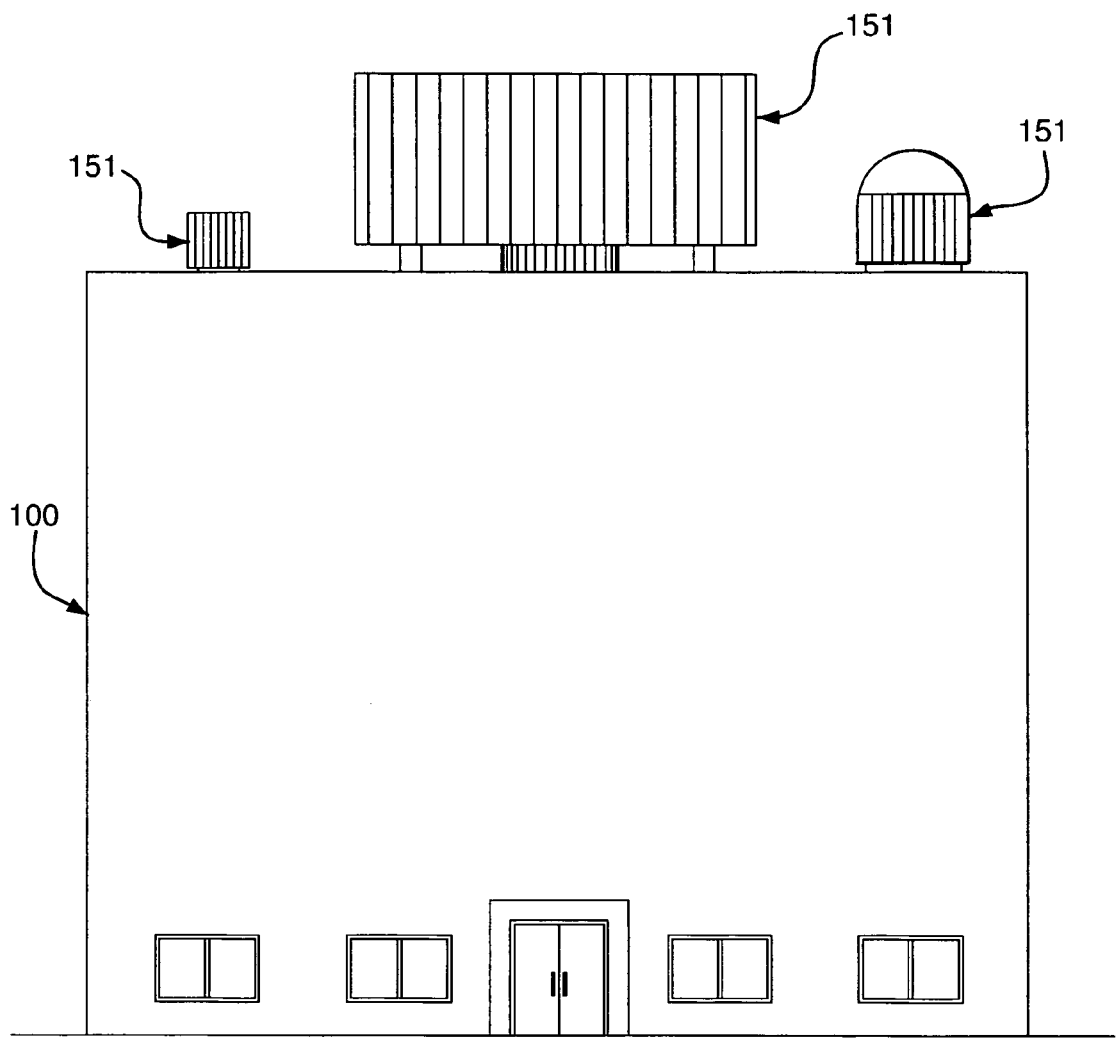
FIG. 31 is a side elevational view illustrating electricity generating assemblies of various sizes mounted on a building.

The stand-alone electricity generating assemblies 151 and 251 may be connected to storage batteries 61, as shown in FIGS. 10A and 10B. Alternatively, the stand-alone electricity generating assemblies may be directly connected to the power supply lines of commercial and residential buildings to provide back-up power supply. As shown in FIG. 31, electricity generating assemblies 151 of various sizes are mounted on a rooftop of a building 10. These electricity generating assemblies 151 may be directly connected to the power supply lines of the building 100 to provide back-up power supply. The size and configuration of the electricity generating assemblies 151 are controlled by several factors, including the size of the available mounting area of the building 100 and the back-up power supply requirements of the building 100.

Figure 17:
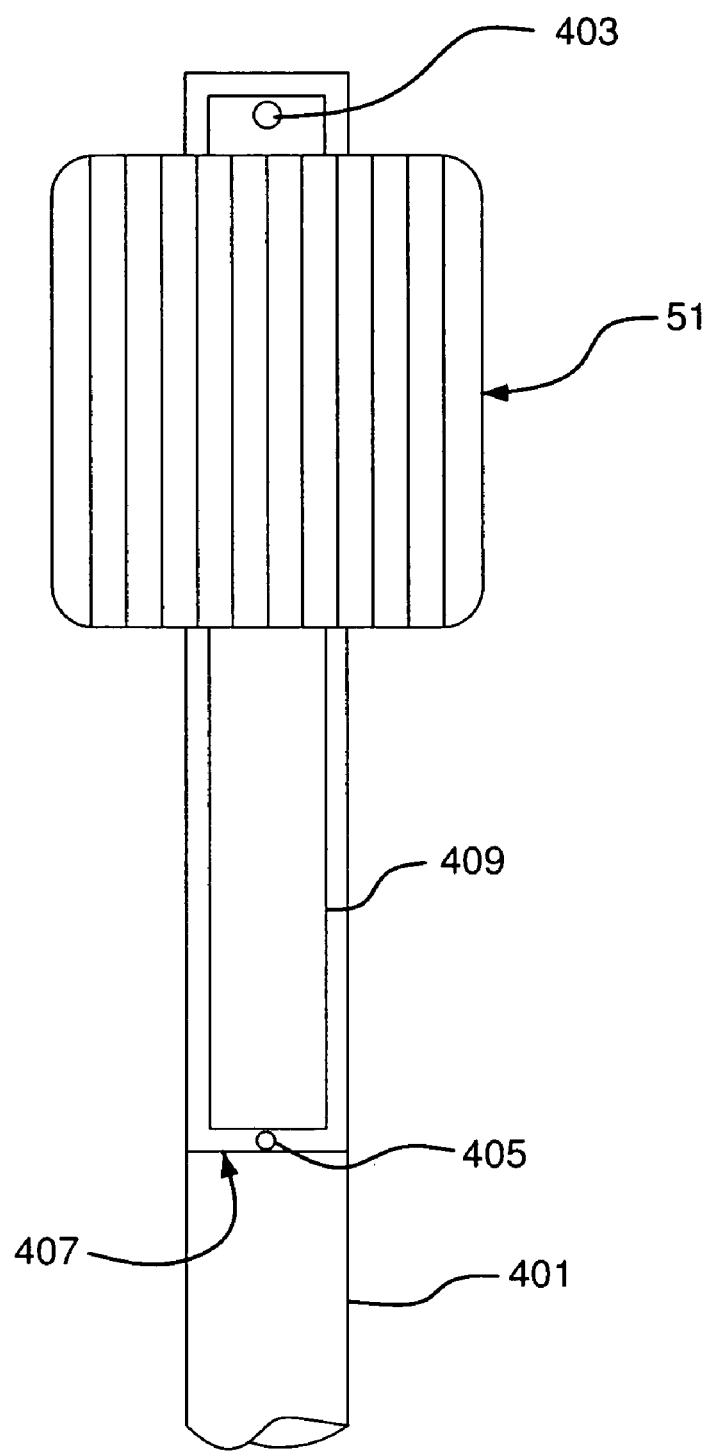
FIG. 17 is an elevational view of an electricity generating assembly mounted on a support including a transformer.

As shown in FIG. 17, an electricity generating assembly 51 is mounted on a support 401 that is substantially hollow. A battery 407 is formed in the hollow space in the support 401. An inlet 403 in the battery allows fluid, such as battery acid, to be filled in the battery 407 disposed in the support 401. A drain 405 allows fluid to be removed from the battery 407. A removable liner 409 may be disposed in the battery 407 to facilitate changing of the fluid. The battery 407 stores electricity generated by the electricity generating assembly 51.

Figure 18:
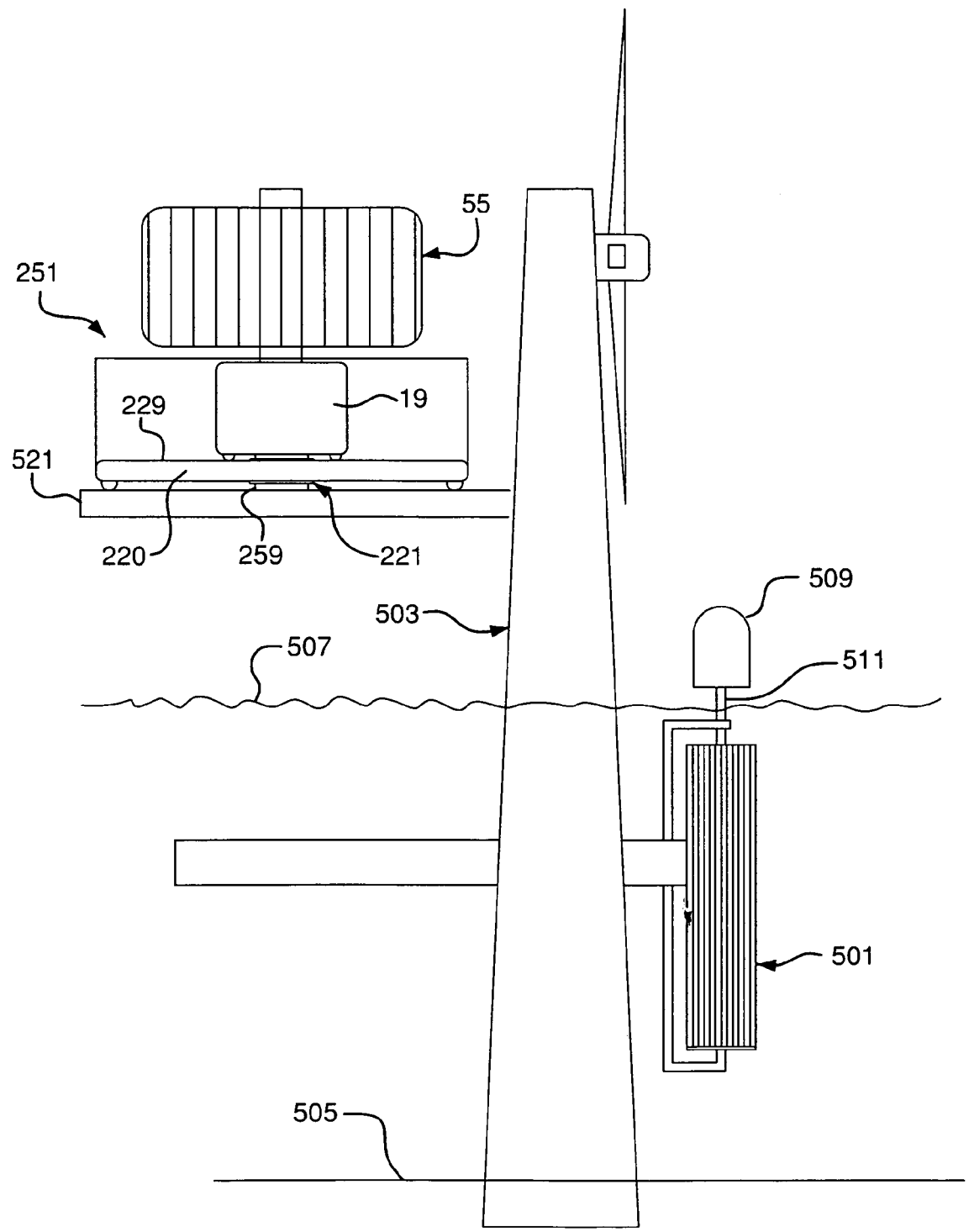
FIG. 18 is an elevational view of an electricity generating assembly mounted in water and above the water surface.

The electricity generated by the exemplary embodiments of the present invention is not limited solely to wind. As shown in FIG. 18, an electricity generating assembly 501 may be disposed beneath a water surface 507 to generate electricity due to water currents. A support 503, such as existing windmills disposed in an ocean floor 505, may receive one or more electricity generating assemblies 501. The generator and associated structure is disposed in a housing 509 mounted above the water surface 507, thereby providing easy access for maintenance. Alternatively, the generator shaft 511 may be a telescoping shaft such that the generator housing 509 may be disposed beneath the water surface 507 and then raised when maintenance is required. Thus, water flowing through the assembly 501 causes rotation of the fan blades, thereby generating electricity. The electricity generating assembly 501 is substantially similar to the afore-described electricity generating assemblies except that the fluid generating electricity is water rather than air. The plurality of fan blades may be made of plastic or other suitable material resistant to the growth of barnacles and other water formations.

As shown in FIG. 18, a first electricity generating assembly 251 (similar to the electricity generating assembly of FIG. 12) may be mounted to a support 521 above the water surface 507 to generate electricity by rotation of the fan blades by wind. A second electricity generating assembly 501 may be mounted beneath the water surface 507 to generate electricity due to water currents. Between the first and second electricity generating assemblies both wind and water currents are harnessed to generate electricity.

Figure 19:
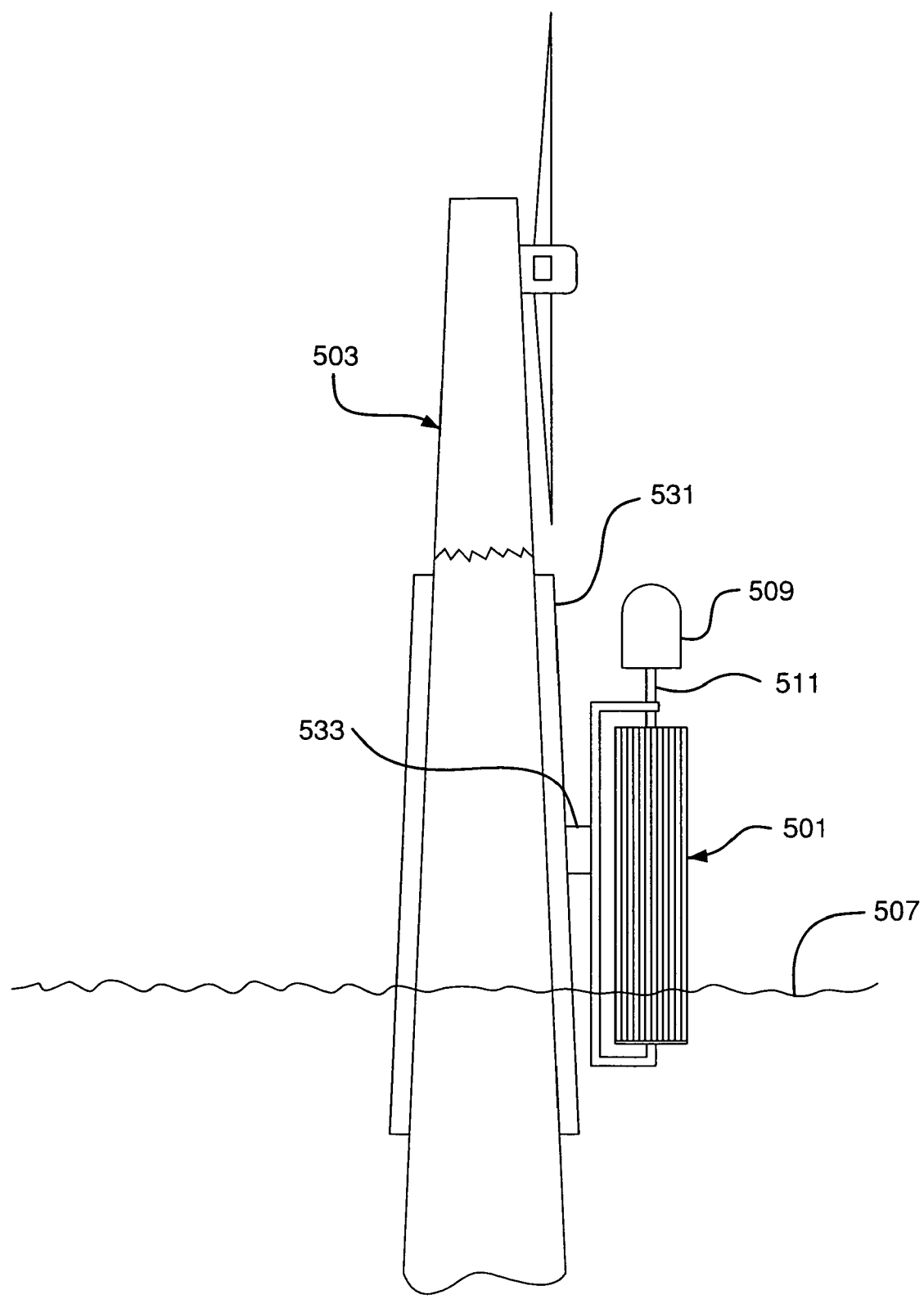
FIG. 19 is an elevational view of an electricity generating assembly movably mounted to a support such that the electricity generating assembly may be raised above the water surface.

As shown in FIG. 19, the electricity generating assembly 501 has an arm 533 connected to a slotted sleeve 531 that is secured to the support 503. The arm 533 moves up and down within the slot in the sleeve 531 such that the electricity generating assembly 501 may be raised above the water surface 507. This allows the electricity generating assembly 501 to be disposed beneath the water surface 507, as shown in FIG. 18, such that electricity may be generated by water currents. The electricity generating assembly 501 may be raised above the water surface 507 to facilitate access thereto, such as for maintenance. Any suitable conventional method may be used to raise and lower the electricity generating assembly 501, such as mechanical or hydraulic methods.

Figure 20:
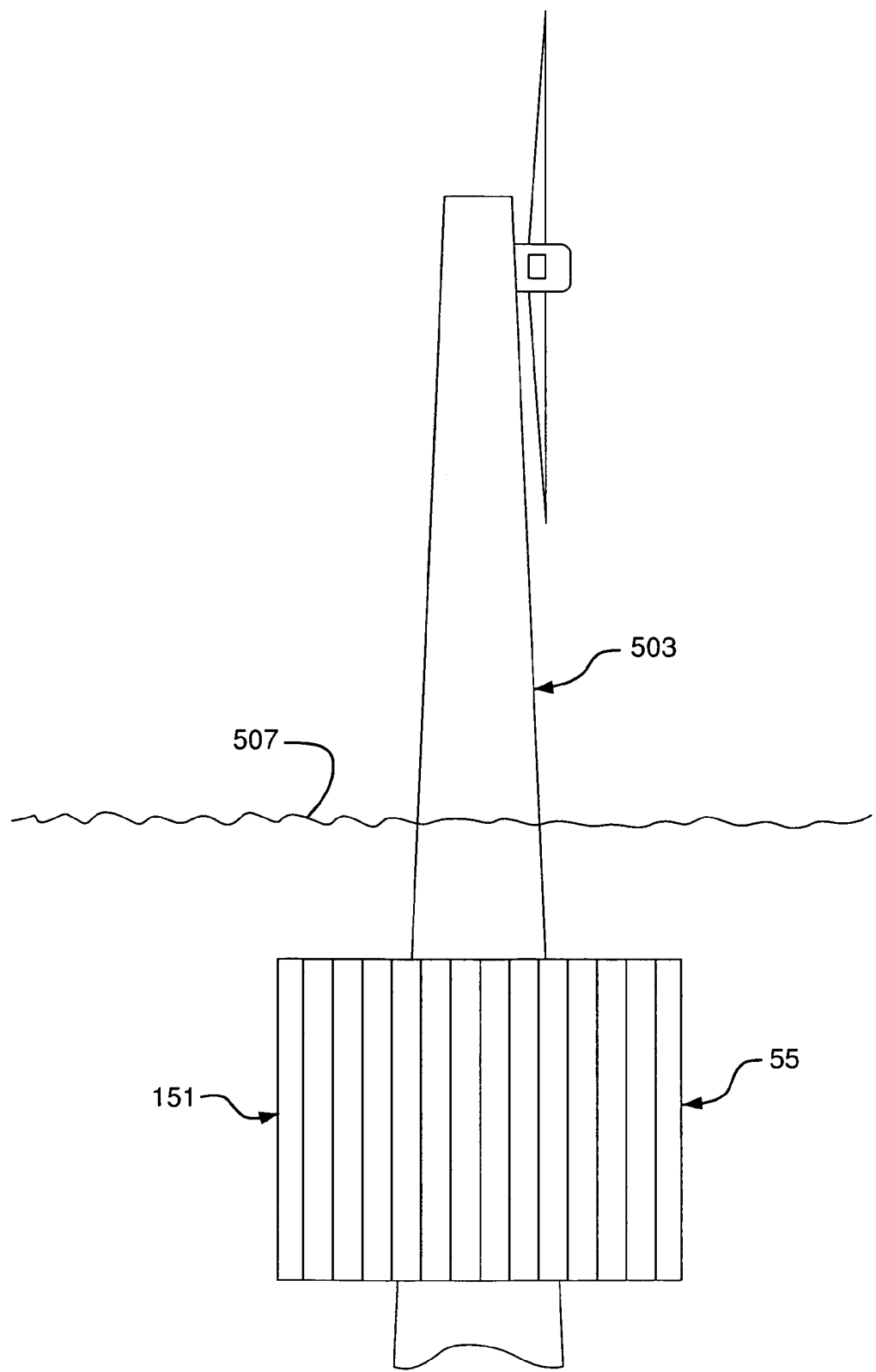
FIG. 20 is an elevational view of an electricity generating assembly mounted on a support underwater.

In another exemplary embodiment of the present invention, an electricity generating assembly 151, substantially similar to the electricity generating assembly shown in FIG. 11, is mounted to a support 503 underwater, as shown in FIG. 20. The support 503 may be an existing structure, such as a windmill. The electricity generating assembly 151 is self-contained such that all the components are housed within the shutter assembly 55. The electricity generating assembly may be raised out of the water in any suitable manner, such as mechanically or hydraulically.

Figure 21:
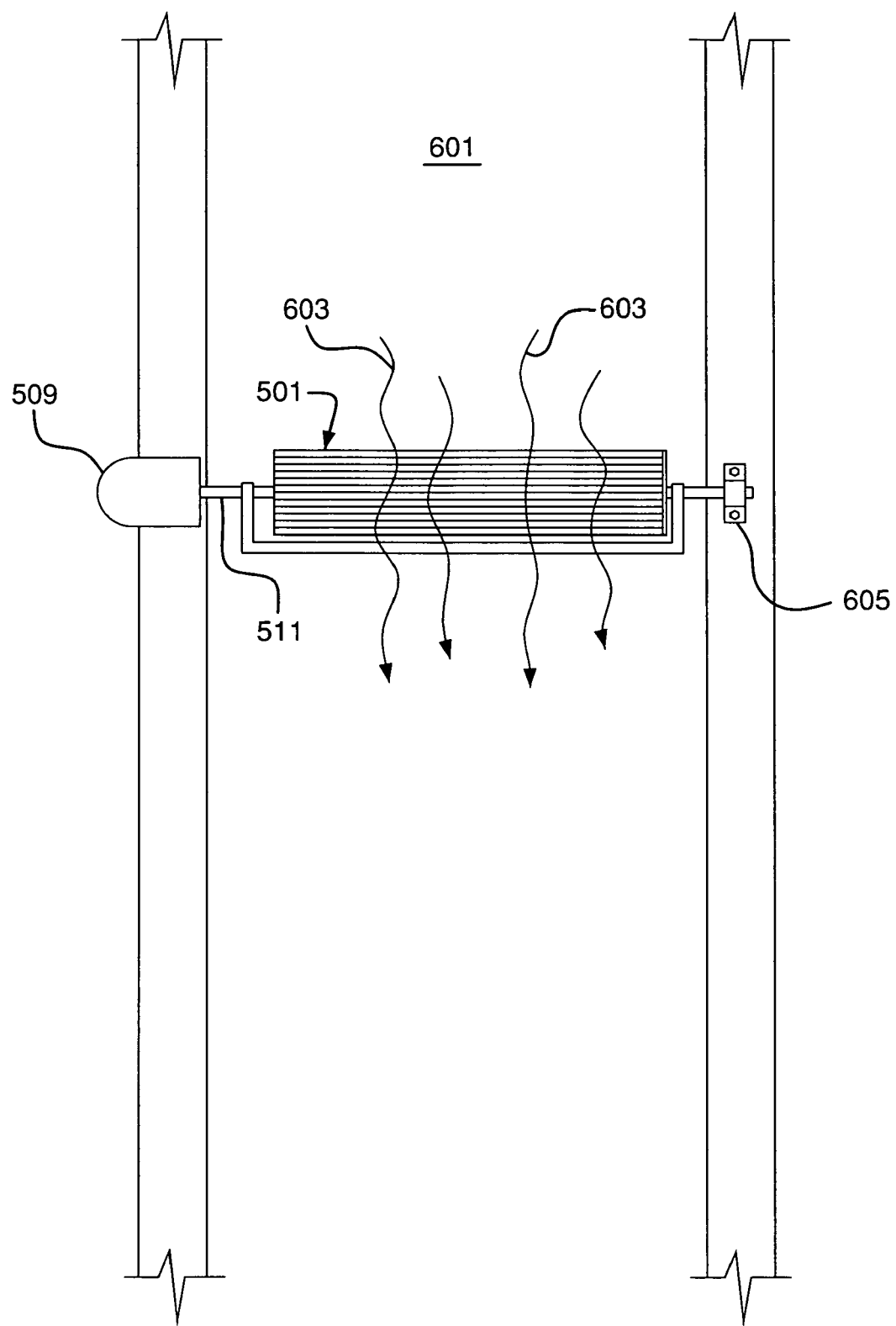
FIG. 21 is a top plan view of an electricity generating assembly mounted across the width of a waterway.

In another exemplary embodiment, as shown in FIG. 21, the electricity generating assembly 501 is mounted underwater in a waterway 601. This allows the electricity generating assembly 501 to be disposed beneath the water surface in the waterway 601, as shown in FIG. 21, such that electricity may be generated by water currents 603 flowing through the electricity generating assembly. Preferably, a first end of the generator shaft 511 is connected to the generator housing 509 mounted on one side of the waterway 601 and a second end of the generator shaft 511 is secured by a support 605 to the opposite side of the waterway. The waterway 601 may be any means through which water moves, such as, but not limited to, canals and dam spillovers and discharges.

An electricity generating assembly 51 according to an exemplary embodiment of the present invention may be easily and inexpensively assembled by adding a generator 19, a shutter assembly 55 and gearing for operation of the generator 19 and the shutter assembly 8 to a conventional "squirrel cage" fan. The shutter assembly 55 prevents foreign objects, such as birds or other debris, from damaging the plurality of fan blades 5. A sensor 53 may be connected to a motor 13 to close the shutter assembly 55 due to high winds or other environmental conditions that could damage the plurality of fan blades 5. The shutter bearing assembly 24 is connected between a shutter drive motor 13 and the shutter assembly 55 to move the plurality of shutters 8 between open and closed positions. A shutter drive rod 28 is disposed between upper and lower fan plates to facilitate opening and closing of the shutter assembly 55.

Figure 22:
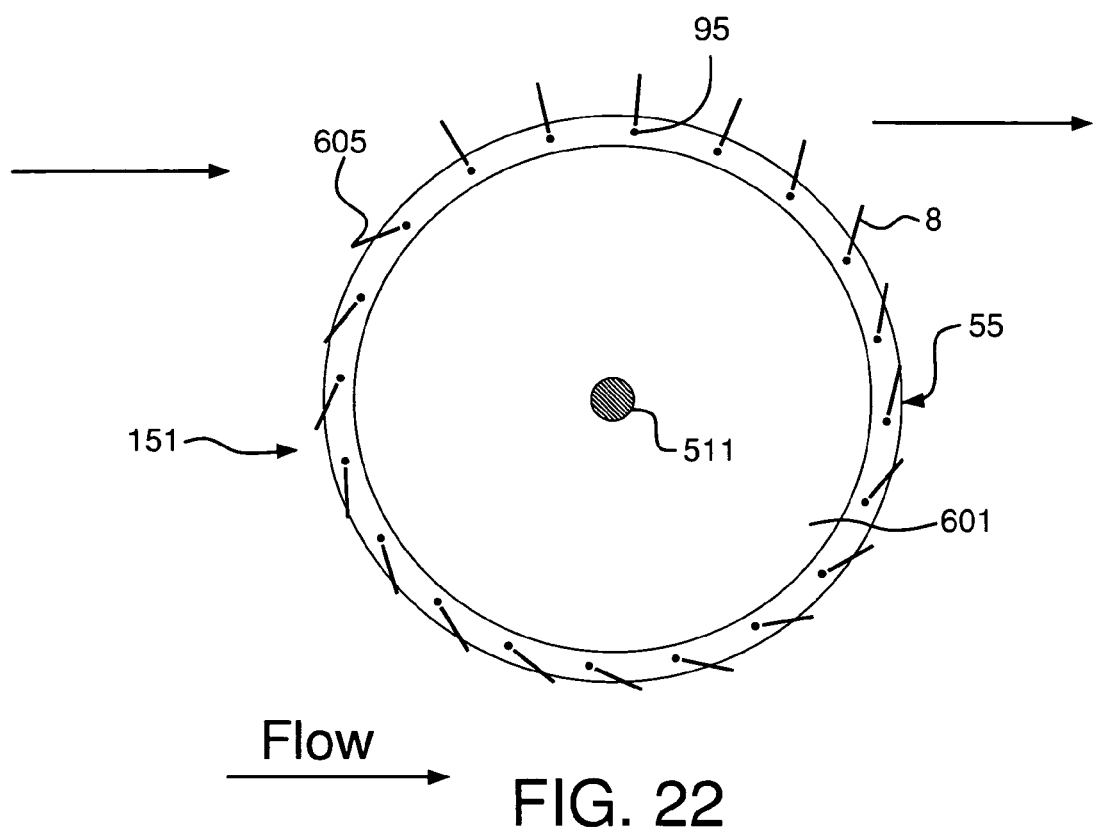
FIGS. 22 and 23 are top plan views of a shutter assembly showing various shutter positions between open and closed.
Figure 23:
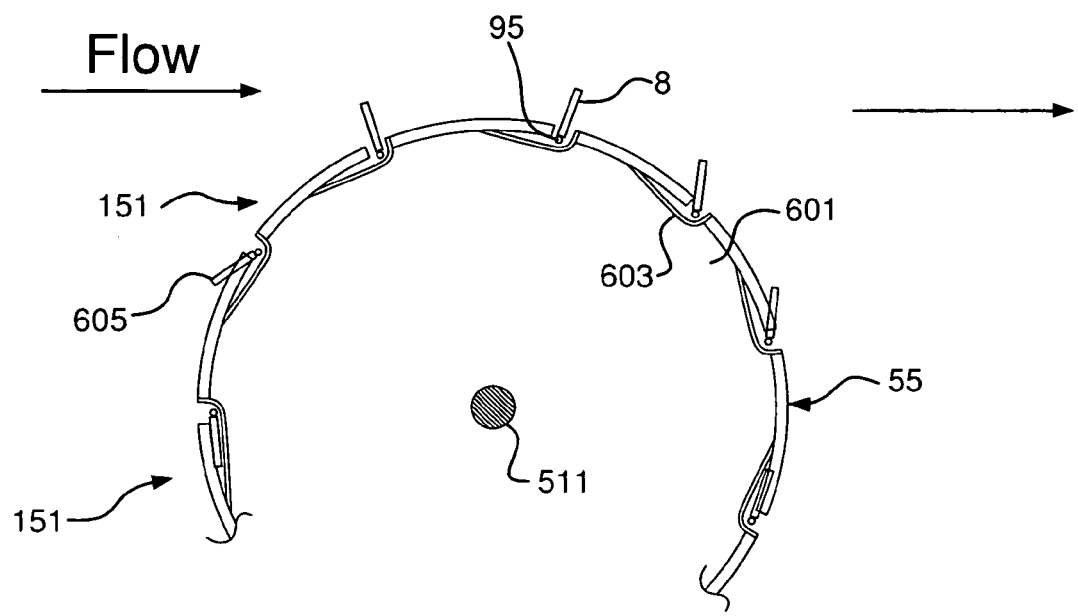
Figure 26:
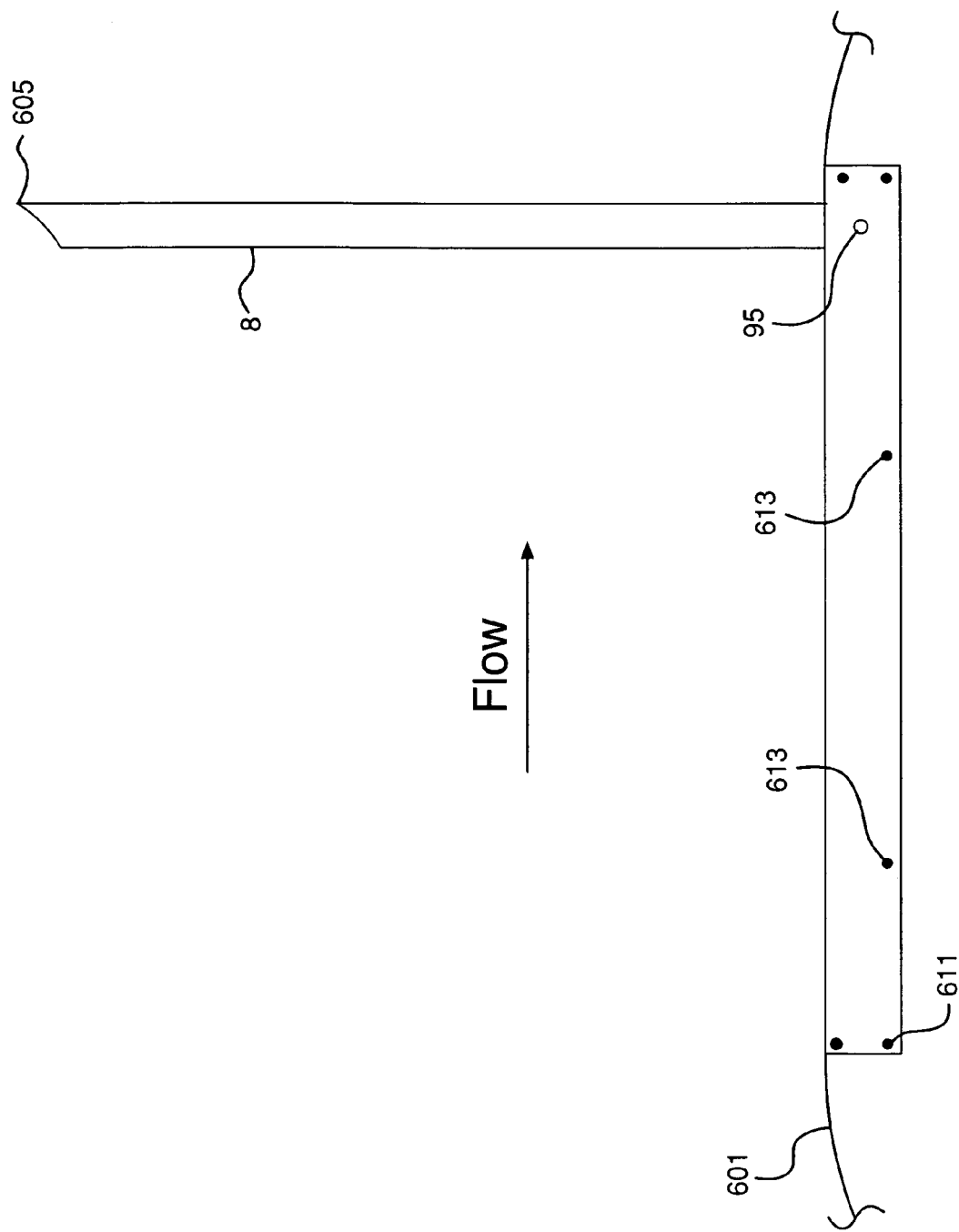

Various positions of the shutter 8 between fully open (FIG. 25) and closed (FIG. 24) for a shutter assembly 55 of an electricity generating assembly 151 are shown in FIGS. 22 and 23. A lip 605, as shown in FIGS. 22-26, may be formed at the end of a shutter 8 to capture the flow to facilitate opening the shutter. Recesses 603 formed in a drum 601 receive the shutters 8 when closed. The recesses 603 have a stop wall 607 to prevent further rotation of the shutter 8 about hinge 95, as shown in FIG. 25. A stopper 609 may be disposed on the stop wall 607 to further facilitate prevention of further shutter rotation. Plates 611 may be connected to the drum 601 by fasteners 613. The hinge 95 is secured to the plates 611, thereby securing the shutters 8 to the drum 601 of the electricity generating assembly 151. The shaft is 511 is disposed within the drum body 601 and connected to the generator housing 509, as shown in FIGS. 19, 22 and 23.

Figure 27:
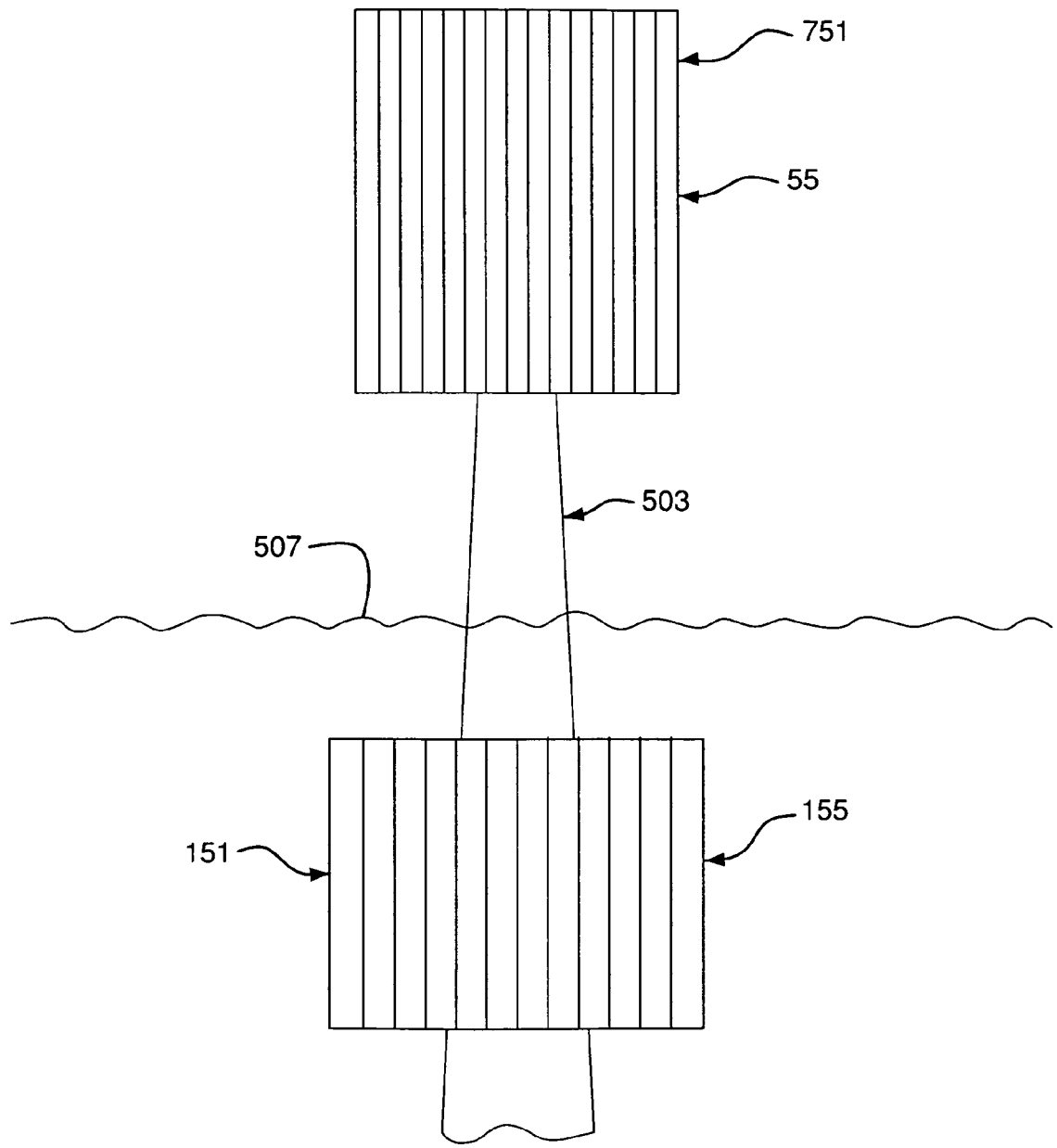
FIG. 27 is a side elevational view of electricity generating assemblies harnessing the power of both wind and water.

As shown in FIG. 27, a first electricity generating assembly 151 is self-contained such that all the components are housed within the shutter assembly 55. The first electricity generating assembly is mounted to a support 503 underwater to generate electricity by rotation of the fan blade by water currents. The support 503 may be an existing structure, such as a windmill. A second electricity generating assembly 751 (similar to the electricity generating assembly of FIG. 12) may be mounted to the support 503 above the water surface 507 to generate electricity by rotation of the fan blades by wind. Between the first and second electricity generating assemblies both wind and water currents are harnessed to generate electricity.

Figure 28:
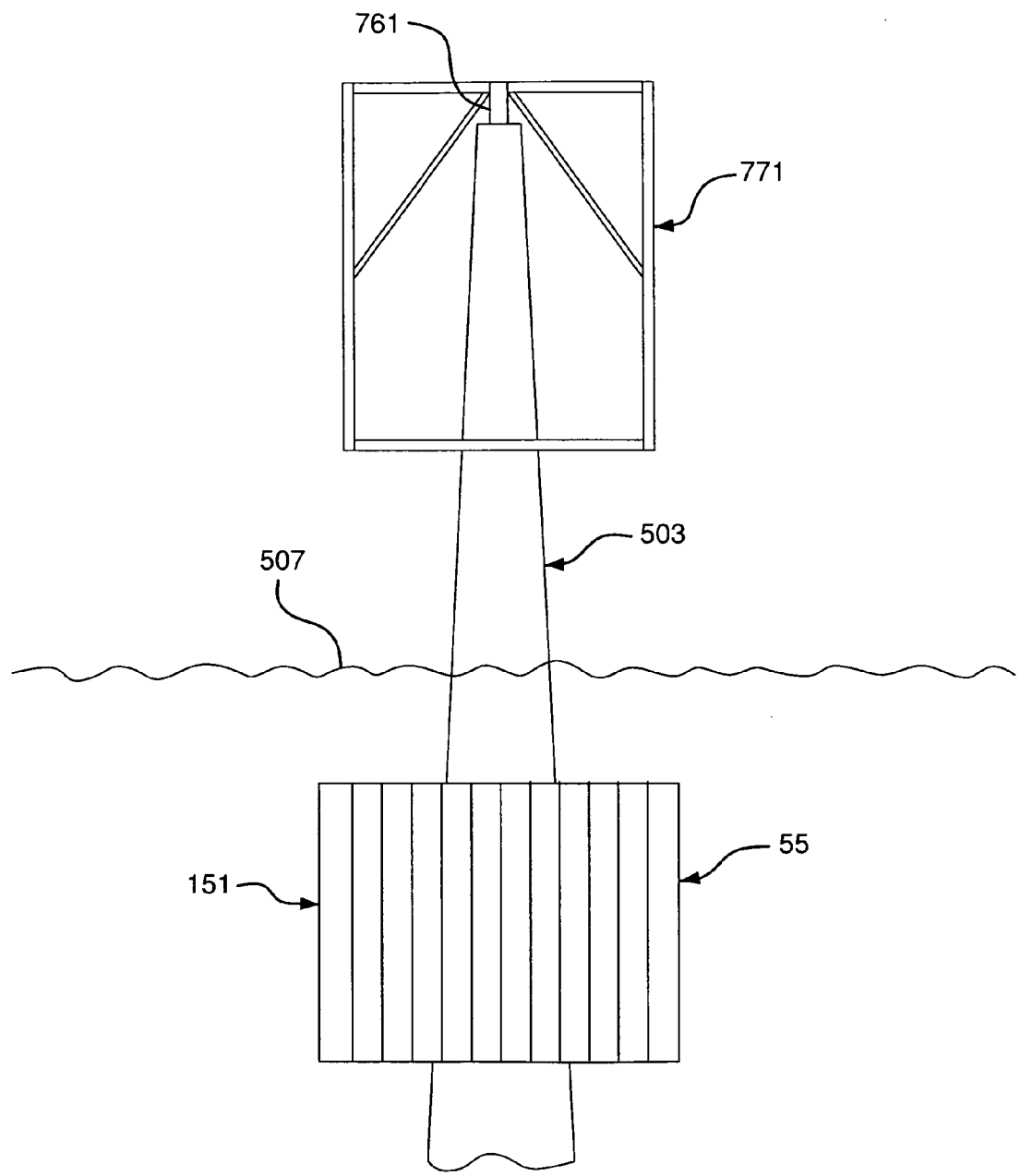
FIG. 28 is a side elevational view of the assembly of FIG. 27 showing a frame to facilitate mounting an electricity generating assembly to a support.
Figure 30:
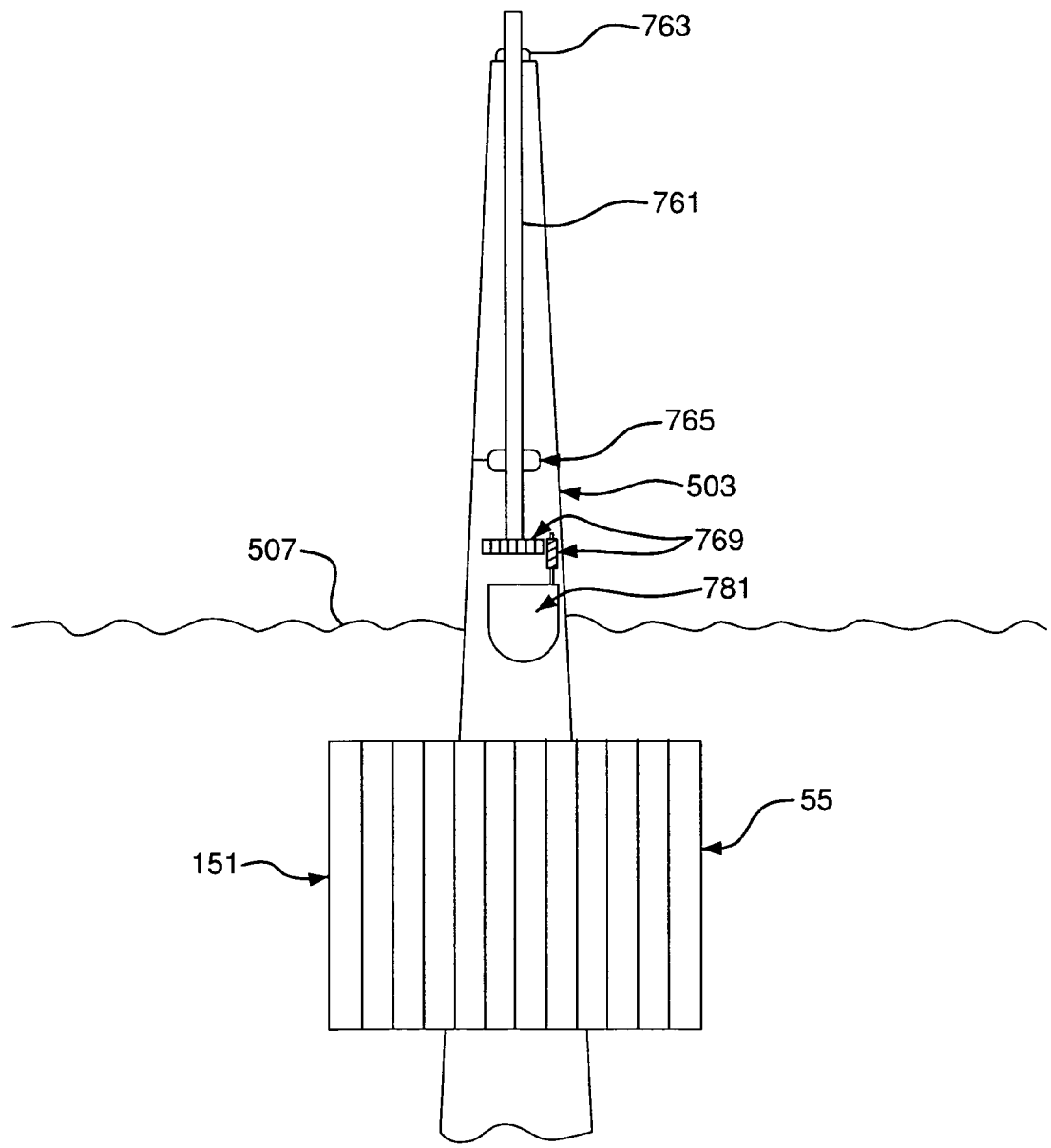
FIG. 30 is a side elevational view of the shaft, generator and bearing assembly of the electricity generating assembly of FIG. 27.

As shown in FIGS. 28 and 30, a shaft 761 is rotatably disposed within the support 503. A frame 771 is secured to the support 503 to facilitate mounting of the second electricity generating assembly 751 to the support 503. An upper bearings 763 and a lower bearing 765 facilitate rotatably mounting the shaft 761 within the support 503. A gear assembly 769 is disposed between the shaft 761 and a generator 781, which is disposed within the support 503. The generator 781 converts rotation of the fan blades into electricity. The rotation of the fan blades being transmitted to the shaft 761, which is in turn transmitted to the generator 781 by the gear assembly 769.

Figure 29:
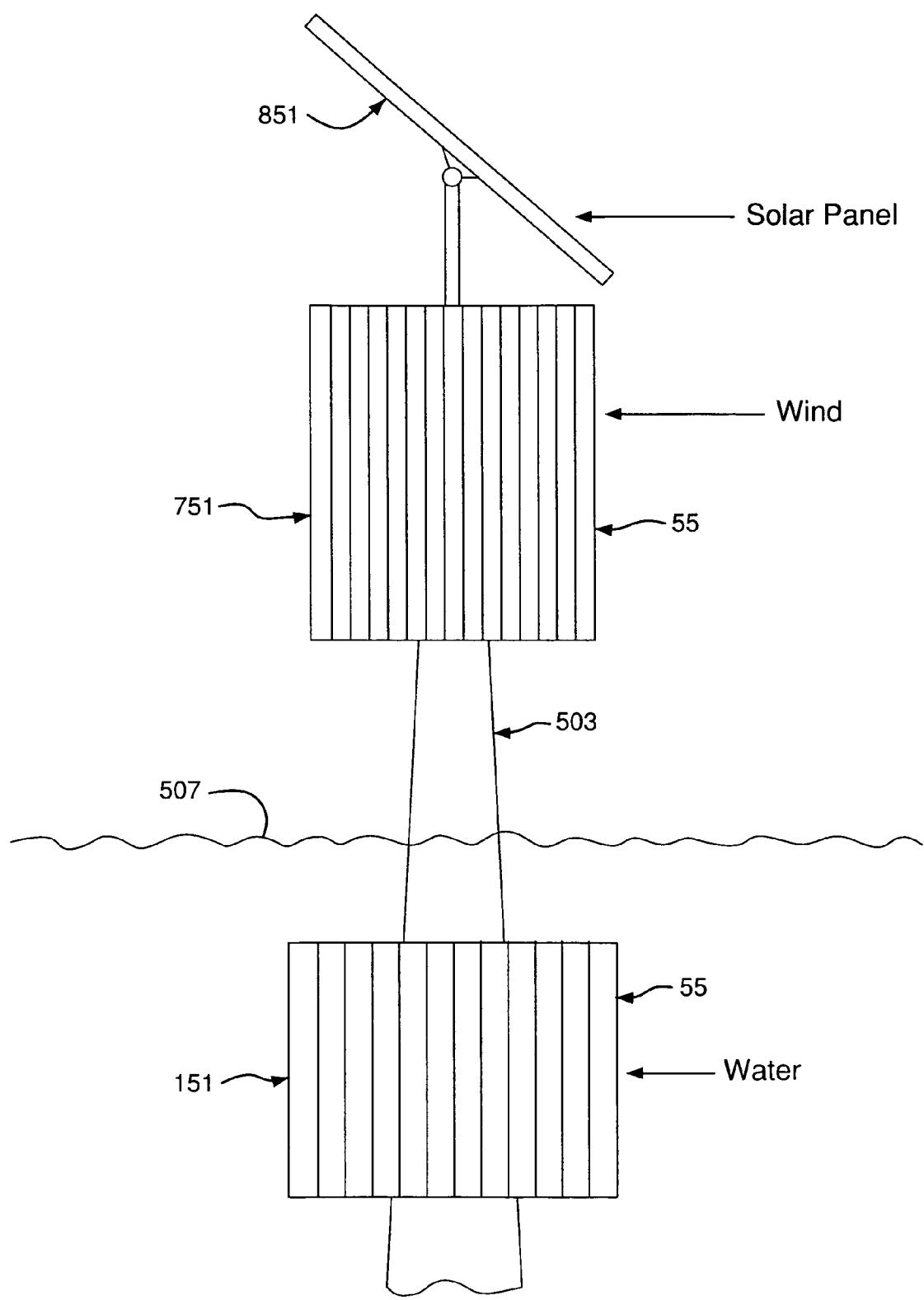
FIG. 29 is a side elevational view of electricity generating assemblies harnessing the power of both wind and water and a solar panel to generate electricity from solar power.

As shown in FIG. 29, a solar panel 851 is mounted to the support 503, thereby generating electricity based on solar power (by solar panel 851), on winds (second electricity generating assembly 751) and on water currents (first electricity generating assembly 151).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electricity generating assembly, comprising:
   a plurality of rotatable fan blades;
   a generator connected to said plurality of fan blades to produce electricity based on rotation of said plurality of fan blades;
   a plurality of shutters surrounding said plurality of fan blades, said plurality of shutters being movable between a first position in which said plurality of shutters are open to allow access to said plurality of fan blades and a second position in which said plurality of shutters are closed to substantially prevent access to said plurality of fan blades;
   a motor connected to said plurality of shutters to move said plurality of shutters between said first and second positions;
   a first weighted wheel connected to said plurality of rotatable fan blades to impart momentum to the rotation of said plurality of fan blades; and
   a second weighted wheel connected to said plurality of rotatable fan blades to rotate in a direction opposite to said first weighted wheel to substantially prevent instability.

2. An electricity generating assembly according to claim 1, wherein
   said generator is disposed externally of said plurality of fan blades.

3. An electricity generating assembly according to claim 1, wherein
   said generator is disposed internally of said plurality of fan blades.

4. An electricity generating assembly according to claim 1, wherein
   a first gear is connected to said plurality of fan blades and a second gear is connected to said generator, said first gear engaging said second gear to transmit the rotation of said plurality of fan blades to said generator.

5. An electricity generating assembly according to claim 1, wherein
   said motor moves said plurality of shutters between first and second position in response to a signal received from a sensor.

6. An electricity generating assembly according to claim 5, wherein
said sensor senses revolutions of said plurality of fan blades or wind speed.

7. An electricity generating assembly according to claim 5, wherein
said sensor is activated by a remote signal.

8. An electricity generating assembly according to claim 1, wherein
said generator is connected to a storage battery to store generated electricity.

9. An electricity generating assembly according to claim 8, wherein
said storage battery is connected to a transformer that is connected to an electrical distribution system to supply electricity stored in said storage battery to the electrical distribution system.

10. An electricity generating assembly according to claim 8, wherein
said storage battery is disposed in a support to which said electricity generating assembly is mounted.

11. An electricity generating assembly according to claim 10, wherein
said storage battery includes a fluid reservoir having an inlet and a drain to facilitate filling and draining of fluid from said storage battery.

12. An electricity generating assembly according to claim 11, wherein
said fluid reservoir has a removable liner to facilitate changing of fluid.

13. An electricity generating assembly according to claim 1, wherein
said generator is connected to a power supply line to a building such that electricity generated by said generator is supplied to the building.

14. An electricity generating assembly according to claim 1, wherein
said plurality of fan blades and said generator are connected to a shaft.

15. An electricity generating assembly according to claim 1, wherein
a rotation axis of said generator and a rotation axis of said plurality of fan blades are offset.

16. An electricity generating assembly according to claim 1, wherein
a first gear is connected to said motor and a second gear is connected to said plurality of shutters to move said plurality of shutters between said first and second positions.

17. An electricity generating assembly according to claim 16, wherein
first and second stops are connected to said second gear to limit movement of said first gear.

18. An electricity generating assembly according to claim 16, wherein
each shutter of said shutter assembly is connected to said second gear by a hinge.

19. An electricity generating assembly according to claim 1, wherein
a pivot rod is disposed proximal said plurality of shutters to guide said plurality of shutters between said first and second positions.

20. An electricity generating assembly according to claim 1, wherein
a bearing assembly is connected to said plurality of fan blades to facilitate rotation thereof.

21. An electricity generating assembly according to claim 20, wherein
a heat sensor is disposed proximal said bearing assembly.

22. An electricity generating assembly according to claim 21, wherein
said heat sensor is remotely monitored.

23. An electricity generating assembly according to claim 1, wherein
a plurality of rotatable air flow control blades are disposed within said plurality of fan blades to direct air out of said electricity generating assembly to reduce drag on said generator.

24. An electricity generating assembly according to claim 1, wherein
said electricity generating assembly is mounted underwater such that water rotates said plurality of fan blades.

25. An electricity generating assembly according to claim 24, wherein
said electricity generating assembly is movably mounted such that said electricity generating assembly is adapted to be raised above the water surface to facilitate access thereto.

26. An electricity generating assembly according to claim 1, wherein
said electricity generating assembly is mounted above ground such that air rotates said plurality of fan blades.

27. An electricity generating assembly according to claim 1, wherein
a solar collecting device is disposed on said plurality of shutters to generate electricity from sunlight.

28. An electricity generating assembly according to claim 27, wherein
said solar collecting device is solar tape.

29. An electricity generating assembly according to claim 1, wherein
said first weighted wheel is wired to act as an armature and a magnet is disposed outside the first weighted wheel, thereby producing electricity when said first weighted wheel rotates through a magnetic field created by said magnet.

30. An electricity generating assembly according to claim 1, wherein
a first electricity generating assembly is mounted above ground such that air rotates said plurality of fan blades and a second electricity generating assembly is mounted underwater such that water rotates said plurality of fan blades.

31. An electricity generating assembly, comprising:
a plurality of rotatable fan blades;
a generator connected to said plurality of fan blades to produce electricity based on rotation of said plurality of fan blades;
a plurality of shutters surrounding said plurality of fan blades, said plurality of shutters being movable between a first position in which said plurality of shutters are open to allow access to said plurality of fan blades and a second position in which said plurality of shutters are closed to substantially prevent access to said plurality of fan blades;
a motor connected to said plurality of shutters to move said plurality of shutters between said first and second positions;
a first weighted wheel connected to said plurality of rotatable fan blades to impart momentum to the rotation of said plurality of fan blades, said first weighted wheel being wired to act as an armature; and a magnet disposed outside the first weighted wheel such that electricity is produced when said first weighted wheel rotates through a magnetic field created by said magnet.

32. An electricity generating assembly according to claim 31, wherein
said generator is disposed externally of said plurality of fan blades.

33. An electricity generating assembly according to claim 31, wherein
said generator is disposed internally of said plurality of fan blades.

34. An electricity generating assembly according to claim 31, wherein
a first gear is connected to said plurality of fan blades and a second gear is connected to said generator, said first gear engaging said second gear to transmit the rotation of said plurality of fan blades to said generator.

35. An electricity generating assembly according to claim 31, wherein
said motor moves said plurality of shutters between first and second position in response to a signal received from a sensor.

36. An electricity generating assembly according to claim 35, wherein
said sensor senses revolutions of said plurality of fan blades or wind speed.

37. An electricity generating assembly according to claim 35, wherein
said sensor is activated by a remote signal.

38. An electricity generating assembly according to claim 31, wherein
said generator is connected to a storage battery to store generated electricity.

39. An electricity generating assembly according to claim 38, wherein
said storage battery is connected to a transformer that is connected to an electrical distribution system to supply electricity stored in said storage battery to the electrical distribution system.

40. An electricity generating assembly according to claim 31, wherein
said generator is connected to a power supply line to a building such that electricity generated by said generator is supplied to the building.

41. An electricity generating assembly according to claim 31, wherein
said plurality of fan blades and said generator are connected to a shaft.

42. An electricity generating assembly according to claim 31, wherein
a rotation axis of said generator and a rotation axis of said plurality of fan blades are offset.

43. An electricity generating assembly according to claim 31, wherein
a first gear is connected to said motor and a second gear is connected to said plurality of shutters to move said plurality of shutters between said first and second positions.

44. An electricity generating assembly according to claim 43, wherein
first and second stops are connected to said second gear to limit movement of said first gear.

45. An electricity generating assembly according to claim 31, wherein
a pivot rod is disposed proximal said plurality of shutters to guide said plurality of shutters between said first and second positions.

46. An electricity generating assembly according to claim 31, wherein
a bearing assembly is connected to said plurality of fan blades to facilitate rotation thereof.

47. An electricity generating assembly according to claim 46, wherein
a heat sensor is disposed proximal said bearing assembly.

48. An electricity generating assembly according to claim 47, wherein
said heat sensor is remotely monitored.

49. An electricity generating assembly according to claim 43, wherein
each shutter of said shutter assembly is connected to said second gear by a hinge.

50. An electricity generating assembly according to claim 31, wherein
a plurality of rotatable air flow control blades are disposed within said plurality of fan blades to direct air out of said electricity generating assembly to reduce drag on said generator.

51. An electricity generating assembly according to claim 38, wherein
said storage battery is disposed in a support to which said electricity generating assembly is mounted.

52. An electricity generating assembly according to claim 51, wherein
said storage battery includes a fluid reservoir having an inlet and a drain to facilitate filling and draining of fluid from said storage battery.

53. An electricity generating assembly according to claim 52, wherein
said fluid reservoir has a removable liner to facilitate changing of fluid.

54. An electricity generating assembly according to claim 31, wherein
said electricity generating assembly is mounted underwater such that water rotates said plurality of fan blades.

55. An electricity generating assembly according to claim 31, wherein
said electricity generating assembly is mounted above ground such that air rotates said plurality of fan blades.

56. An electricity generating assembly according to claim 31, wherein
a solar collecting device is disposed on said plurality of shutters to generate electricity from sunlight.

57. An electricity generating assembly according to claim 56, wherein
said solar collecting device is solar tape.

58. An electricity generating assembly according to claim 31, wherein
a first electricity generating assembly is mounted above ground such that air rotates said plurality of fan blades and a second electricity generating assembly is mounted underwater such that water rotates said plurality of fan blades.

59. An electricity generating assembly according to claim 54, wherein
said electricity generating assembly is movably mounted such that said electricity generating assembly is adapted to be raised above the water surface to facilitate access thereto.

* * * * *